(12) United States Patent
Dustin et al.

(10) Patent No.: US 11,254,779 B1
(45) Date of Patent: *Feb. 22, 2022

(54) REWORKABLE IONOMERS

(71) Applicant: HRL Laboratories, LLC, Malibu, CA (US)

(72) Inventors: Ashley M. Dustin, Los Angeles, CA (US); April R. Rodriguez, Santa Monica, CA (US); Shanying Cui, Calabasas, CA (US); Andrew P. Nowak, Los Angeles, CA (US); Adam F. Gross, Santa Monica, CA (US)

(73) Assignee: HRL Laboratories, LLC, Malibu, CA (US)

(*) Notice: Subject to any disclaimer, the term of this patent is extended or adjusted under 35 U.S.C. 154(b) by 131 days.

This patent is subject to a terminal disclaimer.

(21) Appl. No.: 16/419,171

(22) Filed: May 22, 2019

Related U.S. Application Data

(63) Continuation-in-part of application No. 15/792,098, filed on Oct. 24, 2017, which is a continuation-in-part
(Continued)

(51) Int. Cl.
*C08G 18/24* (2006.01)
*C08G 18/48* (2006.01)
(Continued)

(52) U.S. Cl.
CPC ..... *C08G 18/0809* (2013.01); *C08G 18/0823* (2013.01); *C08G 18/10* (2013.01);
(Continued)

(58) Field of Classification Search
CPC .. C09D 175/08; C09D 7/1216; C09D 7/1233; C08G 18/10; C08G 18/0823;
(Continued)

(56) References Cited

U.S. PATENT DOCUMENTS

| | | | |
|---|---|---|---|
| 3,435,003 | A | 3/1969 | Craven |
| 3,810,874 | A | 5/1974 | Mitsch et al. |

(Continued)

FOREIGN PATENT DOCUMENTS

| | | | | |
|---|---|---|---|---|
| CN | 104277638 | A | * | 1/2015 |
| CN | 106118427 | A | * | 11/2016 |

(Continued)

OTHER PUBLICATIONS

CN-106118427_English Translation_Nov. 2016.*
(Continued)

*Primary Examiner* — Michael L Leonard
(74) *Attorney, Agent, or Firm* — O'Connor & Company

(57) ABSTRACT

Some variations provide a reworkable ionomer composition comprising: a polymer containing a plurality of ionic monomers disposed in a chain backbone of the polymer, wherein the ionic monomers have a monomer charge polarity that is either positive or negative; and a plurality of ionic species disposed within the chain backbone of the polymer, wherein the ionic species have opposite charge polarity compared to the monomer charge polarity, wherein the ionic species and the ionic monomers are ionically bonded, and wherein the ionic species are capable of undergoing a reversible oxidation-state transition of at least +1 or −1 when in the presence of a redox reagent. The polymer may be selected from the group consisting of polyurethanes, polyacrylates, polyamides, polyesters, polyureas, polyurethane-ureas, polysiloxanes, polycarbonates, and combinations thereof. Many options for ionic monomers and ionic species are disclosed. These reworkable ionomers are useful for many commercial applications, including coatings and polymer parts.

24 Claims, 7 Drawing Sheets

I = Ionic Species

I = Ionic Species

Related U.S. Application Data of application No. 15/391,749, filed on Dec. 27, 2016, now Pat. No. 10,240,065, which is a continuation-in-part of application No. 15/073,610, filed on Mar. 17, 2016, now Pat. No. 10,259,971.

(60) Provisional application No. 62/698,354, filed on Jul. 16, 2018, provisional application No. 62/417,856, filed on Nov. 4, 2016, provisional application No. 62/271,942, filed on Dec. 28, 2015, provisional application No. 62/269,984, filed on Dec. 19, 2015, provisional application No. 62/269,366, filed on Dec. 18, 2015.

(51) Int. Cl.
| | | |
|---|---|---|
| *C08G 18/50* | (2006.01) | |
| *C09D 175/06* | (2006.01) | |
| *C08G 18/08* | (2006.01) | |
| *C08G 18/72* | (2006.01) | |
| *C09D 175/08* | (2006.01) | |
| *C08G 18/46* | (2006.01) | |
| *C08K 3/08* | (2006.01) | |
| *C08G 18/34* | (2006.01) | |
| *C08G 18/75* | (2006.01) | |
| *C08G 18/10* | (2006.01) | |

(52) U.S. Cl.
CPC ......... *C08G 18/242* (2013.01); *C08G 18/246* (2013.01); *C08G 18/348* (2013.01); *C08G 18/4623* (2013.01); *C08G 18/4825* (2013.01); *C08G 18/4833* (2013.01); *C08G 18/5015* (2013.01); *C08G 18/5024* (2013.01); *C08G 18/72* (2013.01); *C08G 18/758* (2013.01); *C08K 3/08* (2013.01); *C09D 175/06* (2013.01); *C09D 175/08* (2013.01); *C08K 2003/085* (2013.01); *C08K 2003/0856* (2013.01); *C08K 2003/0862* (2013.01)

(58) Field of Classification Search
CPC .. C08G 18/242; C08G 18/246; C08G 18/348; C08G 18/4833; C08G 18/5015; C08G 18/758; C08K 3/08; C08K 2003/085; C08K 2003/0856; C08K 2003/0862
See application file for complete search history.

(56) References Cited

U.S. PATENT DOCUMENTS

| | | | |
|---|---|---|---|
| 3,847,978 A | | 11/1974 | Sianesi et al. |
| 4,299,895 A | | 11/1981 | Archie et al. |
| 4,632,954 A | * | 12/1986 | Dalhuisen ............ C08K 5/18 524/240 |
| 4,777,224 A | | 10/1988 | Gorzynski et al. |
| 4,956,438 A | | 9/1990 | Ruetman et al. |
| 5,032,666 A | | 7/1991 | Hu et al. |
| 5,084,315 A | | 1/1992 | Karimi et al. |
| 5,097,010 A | * | 3/1992 | Markle ............ C08G 18/2815 525/195 |
| 5,189,135 A | | 2/1993 | Cozzi et al. |
| 5,332,798 A | | 7/1994 | Ferreri et al. |
| 5,589,552 A | | 12/1996 | Simeone et al. |
| 6,071,564 A | | 6/2000 | Marchetti et al. |
| 6,926,937 B2 | | 8/2005 | Extrand et al. |
| 6,992,132 B2 | | 1/2006 | Trombetta et al. |
| 7,655,310 B2 | | 2/2010 | Trombetta |
| 2004/0019143 A1 | | 1/2004 | Koloski et al. |
| 2004/0067433 A1 | | 4/2004 | Nirmal et al. |
| 2005/0164010 A1 | | 7/2005 | Trombetta |
| 2005/0181252 A1 | | 8/2005 | Risen, Jr. et al. |
| 2008/0219944 A1 | | 9/2008 | Longo et al. |
| 2009/0127492 A1 | | 5/2009 | Risen, Jr. et al. |
| 2010/0324205 A1 | | 12/2010 | Maier et al. |
| 2011/0218290 A1 | | 9/2011 | Webster et al. |
| 2011/0213085 A1 | | 11/2011 | Tonelli et al. |
| 2012/0164565 A1 | | 6/2012 | Qiu |
| 2012/0308828 A1 | * | 12/2012 | Iwazumi ............ C08G 18/6692 428/412 |
| 2015/0158969 A1 | | 6/2015 | Nowak |
| 2015/0329453 A1 | | 11/2015 | Guarda et al. |

FOREIGN PATENT DOCUMENTS

| | | |
|---|---|---|
| EP | 1558661 B1 | 12/2012 |
| WO | 2005086628 A2 | 9/2005 |
| WO | 2013158360 A1 | 10/2013 |

OTHER PUBLICATIONS

CN-104277638_English Translation_Jan. 2015.*
Ashish Vaidya and Manoj K. Chaudhury, "Synthesis and Surface Properties of Environmentally Responsive Segmented Polyurethanes," Journal of Colloid and Interface Science 249, 235-245 (2002).
Siochi et al., "Engineered Surfaces for Mitigation of Insect Residue Adhesion" NF1676L-15481 SAMPE 2013; May 6-9, 2013; Long Beach, CA; United States.
Wohl et al., "Evaluation of commercially available materials to mitigate insect residue adhesion on wing leading edge surfaces," Progress in Organic Coatings 76 (2013) 42-50.
Kok et al., "Influence of surface characteristics on insect residue adhesion to aircraft leading edge surfaces," Progress in Organic Coatings 76 (2013) 1567-1575.
Lee et al., "Zwitter-Wettability and Antifogging Coatings with Frost-Resisting Capabilities," ACS Nano 7 (2013) 2172-2185.
Chen et al., "Robust Prototypical Anti-icing Coatings with a Self-lubricating Liquid Water Layer between Ice and Substrate," ACS Appl. Mater. Interfaces 5 (2013) 4026-4030.
Turri et al., "Waterborne Anionomeric Polyurethane-Ureas from Functionalized Fluoropolyethers," Journal of Applied Polymer Science, vol. 93, 136-144 (2004).
Dou et al., "Anti-icing Coating with an Aqueous Lubricating Layer," ACS Appl. Mater. Interfaces 2014, 6, 6998-7003.
Wang et al., "Investigation of the role of hydrophilic chain length in amphiphilic perfluoropolyether/poly(ethylene glycol) networks: towards high-performance antifouling coatings," Biofouling vol. 27, No. 10, Nov. 2011, 1139-1150.
Chen et al., "A Thermally Re-mendable Cross-Linked Polymeric Material," Science 295 (5560), 1698-1702, Mar. 1, 2002.
Oster et al., "Photoreduction of Metal Ions by Visible Light," Departmenotf Chemistry, Polytechnic Institute of Brooklyn, 135th National meeting of the American Chemical Society, Nov. 5, 1959.
Wojtecki et al., "using the dynamic bond to access macroscopically responsive structurally dynamic polymers," Nature Materials vol. 10, Jan. 2011.
Min et al., "Use of Ascorbic Acid as Reducing Agent for Synthesis of Well-Defined Polymers by ARGET ATRP" Macromolecules 2007, 40, 1789-1791.
Nair et al., "Synthesis and characterization of calcium-containing polyurethane using calcium lactate as a chain extender" Polymer Journal (2012) 44, 1009-1014.
Nair et al., "Synthesis, Characterization, and Electrospinning of Calcium-Containing Polyurethane Urea" Advances in Polymer Technology, vol. 35, No. 3, 2016.
Peng et al., "Synthesis of Conjugated Polymers Containing Ionic Transition Metal Complexes" J. Am. Chem. Soc. 1996, 118, 3777-3778.
Xu et al., "Design of Self-Healing Supramolecular Rubbers by Introducing Ionic Cross-Links into Natural Rubber via a Controlled Vulcanization" ACS Appl. Mater. Interfaces 2016, 8, 17728-17737.
Yoon et al., "Self-Healing Polymer Films Based on Thiol-Disulfide Exchange Reactions and Self-Healing Kinetics Measured Using Atomic Force Microscopy" Macromolecules 2012, 45, 142-149.

* cited by examiner

I = Ionic Species

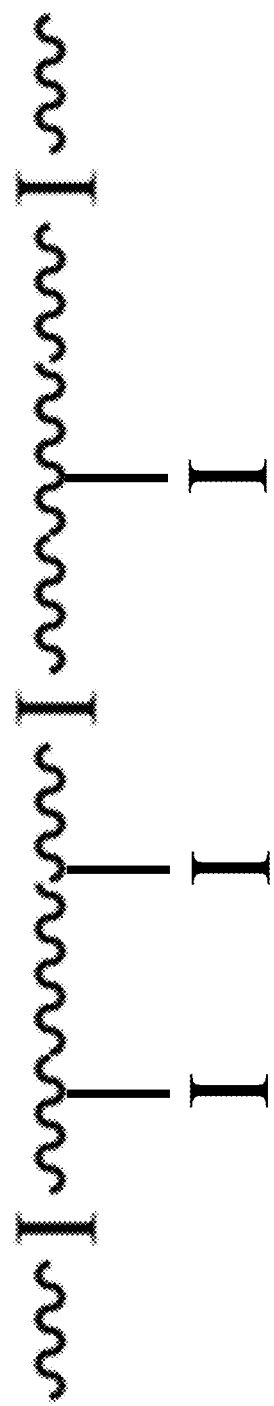

REWORKABLE IONOMERS

PRIORITY DATA

This patent application is a non-provisional application claiming priority to U.S. Provisional Patent App. No. 62/698,354, filed on Jul. 16, 2018, which is hereby incorporated by reference herein. This patent application is also a continuation-in-part application of U.S. patent application Ser. No. 15/792,098, filed on Oct. 24, 2017, which in turn is a continuation-in-part application of U.S. Pat. No. 10,240,065, issued on Mar. 26, 2019, which in turn is a continuation-in-part application of U.S. Pat. No. 10,259,971, issued on Apr. 16, 2019, each of which is hereby incorporated by reference herein.

FIELD OF THE INVENTION

The present invention generally relates to polymers with reworkable properties, and methods of making and using these polymers.

BACKGROUND OF THE INVENTION

Historically, improvements to polymer properties have focused on static properties including strength, thermostability, toughness, and durability. Recent research has broadened to incorporate multifunctionality into polymers that can adapt to their environment, with dynamic properties such as recyclability, remoldability, self-healing, and shape memory. The ability to rework and remold certain polymers is of great interest due to increased awareness of recycling, high cost of materials, and the ability to extend the life of a material through in situ repair. In order to accomplish many of these properties, it is necessary to form and break bonds or crosslinks.

There are two classes of polymer materials that are categorized based on their network structure: thermosets and thermoplastics. Thermosets are polymers that are heated, molded, and cured to form a permanent shape and can no longer be reworked due to network constraints when cured. Thermoplastics will soften upon heating, becoming flowable, which allows them to be remolded multiple times without loss of properties. The biggest distinction between the two polymer classes is the crosslinking architecture of the network. Thermosets tend to have a high density of crosslinking—specifically, interchain covalent bonds—that hold all the polymer chains together. This architecture gives thermosets high thermal stability, high rigidity, dimensional stability, and resistance to deformation, which makes them desirable, but removes the ability to recycle, reshape, and repair. By contrast, thermoplastics are made up primarily of long individual polymer chains that associate together to form a network. Remolding and reshaping thermoplastics is made possible due to non-covalent associations between the polymer chains; however, the reduced number of crosslinks makes the material more vulnerable to creep under stress.

Introducing reversible bonding into a polymer network could controllably capture the advantages of both a thermoset and thermoplastic. A conventional problem with crosslinking a network is that the material becomes non-recyclable and non-formable. However, if bonds could be removed within the polymer, the desirable properties of a thermoplastic—remolding and shaping—would be possible.

Research in reversible crosslinking within materials dates back to the 1960s, where the majority of the work was based on thermally triggered Diels-Alder chemistry. Uniform heating of a part is required, but with Diels-Alder chemistry, uniform heating is generally difficult to achieve for large parts. Moreover, the response is slow and gradual, due to the low thermal conductivity of polymers as well as the bond breakage that occurs over a wide temperature range. Also, structural parts made from this chemistry suffer from heat sensitivity.

New approaches are needed that provide greater flexibility in trigger mechanisms and strategies for bond reversibility. It is known that polymer materials, in addition to being thermoresponsive, can be synthesized to be responsive to chemicals, mechanics, light, and/or electricity.

In chemoresponsive materials, supramolecular-based polymer systems can be altered by components that compete with existing covalent bonds. These systems are difficult and expensive to synthesize, and no clear path can be seen for altering manufactured parts. Polymer materials instead can be synthesized to be responsive to mechanical forces. Mechanoresponsive materials rely on ultrasonication or other means of mechanical stress to break crosslinking chains. Large material parts would suffer from energy transfer challenges. Reversibility of such systems relies on the re-equilibration of the components with time, a slow and undesirable process. Polymer materials can be synthesized to be responsive to electricity. Electroresponsive materials are triggered by an electrical potential that often oxidizes or reduces components. This is a poorly studied subject, likely due to the low electrical conductivity of polymer systems.

In view of the shortcomings in the art, what is desired is non-thermal reversible bonding in polymers for mechanical tunability and reworkability, preferably exploiting naturally occurring stimuli, such as natural light. These polymers would be useful for many applications, including (but not limited to) coatings and polymer parts.

SUMMARY OF THE INVENTION

The present invention addresses the aforementioned needs in the art, as will now be summarized and then further described in detail below.

Some variations provide a reworkable ionomer composition comprising:
  a polymer containing a plurality of ionic monomers disposed in a chain backbone of the polymer, wherein the ionic monomers have a monomer charge polarity that is either positive or negative; and
  a plurality of ionic species disposed within the chain backbone of the polymer, wherein the ionic species have opposite charge polarity compared to the monomer charge polarity, and wherein the ionic species and the ionic monomers are ionically bonded,
  wherein the ionic species are capable of undergoing a reversible oxidation-state transition of at least +1 or −1 when in the presence of a redox reagent.

In some embodiments, the polymer is selected from the group consisting of polyurethanes, polyacrylates, polyamides, polyesters, polyureas, polyurethane-ureas, polysiloxanes, polycarbonates, and combinations thereof.

In some embodiments, the polymer is a segmented polyurethane, such as a segmented polyurethane that comprises:
  (a) one or more first soft segments selected from polyethers or polyesters having an average molecular weight from about 500 g/mol to about 20,000 g/mol, wherein the polyethers or polyesters are $(\alpha,\omega)$-hydroxyl-terminated and/or $(\alpha,\omega)$-amine-terminated;
  (b) optionally, one or more second soft segments selected from second polyesters or second polyethers, wherein the second polyesters or the second polyethers are (α,ω)-hydroxyl-terminated and/or (α,ω)-amine-terminated;

(c) the ionic species residing within a polymer backbone of (i) the first soft segments, (ii) the second soft segments, or (iii) copolymer chains that are distinct from the first and second soft segments;

(d) one or more isocyanate species, or a reacted form thereof, possessing an isocyanate functionality of 2 or greater; and (e) one or more polyol or polyamine chain extenders or crosslinkers, or a reacted form thereof.

In certain embodiments, the second soft segments are present, the first soft segments comprise perfluorinated polyether, and the second soft segments comprise poly(ethylene glycol).

In some reworkable ionomer compositions, the ionic monomers have an oxidation state that is +1 or more positive. In other reworkable ionomer compositions, the ionic monomers have an oxidation state that is −1 or more negative.

The ionic monomers may be selected from carboxylates, sulfonates, phosphates, imidazoliums, or combinations, derivatives, or reaction products thereof.

In some embodiments, the ionic monomers are selected from the group consisting of (2,2-bis-(1-(1-methyl imidazolium)-methylpropane-1,3-diol bromide), 1,2-bis(2'-hydroxyethyl)imidazolium bromide, (3-hydroxy-2-(hydroxymethyl)-2-methylpropyl)-3-methyl-1H-3λ$^4$-imidazol-1-ium bromide, 2,2-bis(hydroxymethyl)butyric acid, N,N-bis(2-hydroxyethyl)-2-aminoethanesulfonic acid, N-methyl-2,2'-iminodiethanol, 3-dimethylamino-1,2-propanediol, 2,2-bis(hydroxymethyl)propionic acid, 1,4-bis(2-hydroxyethyl) piperazine, 2,6-diaminocaproic acid, N,N-bis(2-hydroxyethyl)glycine, 2-hydroxypropanoic acid hemicalsium salt, dimethylolpropionic acid, N-methyldiethanolamine, N-ethyldiethanolamine, N-propyldiethanolamine, N-benzyldiethanolamine, N-t-butyldiethanolamine, bis(2-hydroxyethyl) benzylamine, bis(2-hydroxypropyl) aniline, and homologues, combinations, derivatives, or reaction products thereof.

In various embodiments, the ionic monomers and the ionic species are contained in polymer repeat units, or precursors thereof, selected from the group consisting of calcium L-lactate hydrate, iron (II) lactate hydrate, magnesium L-lactate hydrate, aluminum L-lactate, calcium L-ascorbate dihydrate, magnesium salicylate tetrahydrate, calcium salicylate, calcium salt of p-aminobenzoic acid, magnesium salt of p-aminobenzoic acid, aluminum salt of p-aminobenzoic acid, iron salt of p-aminobenzoic acid, and combinations or derivatives thereof.

In some embodiments, the reworkable ionomer composition further comprises a plurality of additional ionic species disposed in pendant groups attached to the chain backbone of the polymer.

In some reworkable ionomer compositions, the ionic species have an oxidation state that is +2 or more positive. In other reworkable ionomer compositions, the ionic species have an oxidation state that is −2 or more negative. The ionic species may include a multivalent ion with at least one oxidation state that is ±1. The ionic species preferably have a redox potential less than 1.0 V.

In some embodiments, the ionic species is a metal ion or salt thereof, containing for example a metal selected from the group consisting of Cu, Ca, Ni, Hg, Cd, Fe, Co, Ti, Sn, Mg, Al, and combinations thereof.

In some embodiments, the ionic species is an organic ion or salt thereof, such as (but not limited to) p-aminobenzoic acid and/or p-aminobenzoate. For example, the organic ion or salt thereof may contain an organic salt selected from the group consisting of calcium salt of p-aminobenzoic acid, magnesium salt of p-aminobenzoic acid, aluminum salt of p-aminobenzoic acid, iron salt of p-aminobenzoic acid, and combinations thereof.

The reworkable ionomer composition may further comprise a redox reagent, which may be already present and/or added when a redox reaction is desired. When present, the redox reagent may be present in the composition at a concentration from about 0.01 wt % to about 10 wt %.

The redox reagent may be selected from the group consisting of organic acids, organic bases, inorganic acids, inorganic bases, and combinations thereof. In some embodiments, the redox reagent is an organic photosensitizer. In other embodiments, the redox reagent is an inorganic photosensitizer. A mixture of organic and inorganic photosensitizers may be employed.

In some embodiments, the redox reagent is selected from the group consisting of ascorbic acid, catechols, sodium hydroxide, hydrochloric acid, tris(bipyridine)ruthenium(II) ([Ru(bpy)$_3$]$^{2+}$) chloride, methylene blue, titanium dioxide, and combinations thereof, for example.

The reworkable ionomer composition may be disposed in a coating or film. It is also possible to form structural objects from the reworkable ionomer composition—that is, the use of the composition is not limited to coatings and films.

Some variations provide a method of reworking or otherwise treating an ionomer composition, the method comprising:

(a) providing a starting polymer containing a reworkable ionomer composition comprising: a polymer containing a plurality of ionic monomers disposed in a chain backbone of the polymer, wherein the ionic monomers have a monomer charge polarity that is either positive or negative; and a plurality of ionic species disposed within the chain backbone of the polymer, wherein the ionic species have opposite charge polarity compared to the monomer charge polarity, wherein the ionic species and the ionic monomers are ionically bonded, and wherein the ionic species are capable of undergoing a reversible oxidation-state transition of at least +1 or −1 when in the presence of a redox reagent;

(b) providing the redox reagent and effective first reaction conditions for the redox reagent to cause the reversible transition of at least +1 or −1 of an oxidation state of the ionic species, wherein polymer fragments containing the ionic monomers are generated, and wherein the ionic species are disposed within the polymer fragments or are contained within other reaction products; and (c) at a different time from step (b), providing effective second reaction conditions for the redox reagent to cause an opposite transition, compared to step (b), of at least −1 or +1 of the oxidation state of the ionic species, thereby generating a reworked polymer with similar or different mechanical and/or rheological properties, compared to the starting polymer.

BRIEF DESCRIPTION OF THE FIGURES

FIG. 1B is a depiction of ionic species (I) distributed within the main polymer chain, as well as in ionic pendant groups, in some embodiments.

DETAILED DESCRIPTION OF EMBODIMENTS OF THE INVENTION

Figure 1A:
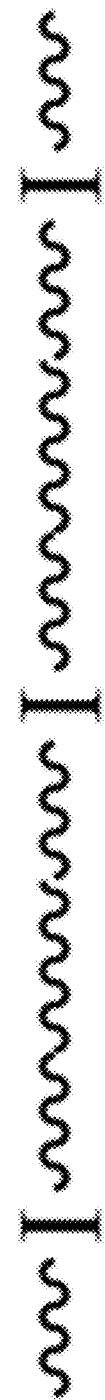
FIG. 1A is a depiction of ionic species (I) distributed within the main polymer chain, in some embodiments.

The materials, compositions, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique. Concentrations may be intermediate to any recited values in a list of concentrations for a particular component.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus, in some embodiments not otherwise explicitly recited, any instance of "comprising" may be replaced by "consisting of" or, alternatively, by "consisting essentially of."

Some variations of the invention are premised on covalently introducing ionic monomers capable of becoming ionically charged within the main chain of a polymer and combining the ionic monomers with low-redox-potential ionic species (e.g., multivalent ions) to induce reversible ionic bonding. Some variations combine polymers and/or polymer networks containing ionic linkages within the main chain with photosensitive dyes for light-induced redox reactions of ionic species (e.g., metal ions) to modify mechanical and/or rheological properties. Some variations combine (a) polymers and/or polymer networks containing ionic linkages within the main chain of a polymer, with (b) redox reagents such as, but not limited to, hydrazine, sodium borohydride, or ascorbic acid, to modify ionic charge of the ionic species (e.g., metal ions) and alter ionic bonding, thereby altering mechanical and/or rheological properties.

The present invention provides polymer compositions capable of reversible bonding by means other than heat, for reworkability and mechanical-property adjustability. In some variations, ionic species (e.g., metals) with a valence number greater than or equal to 2 are employed as building blocks within a polymer backbone containing intrachain ionic linkages. Such a polymer is referred to herein as an "ionomer." Note that "ionic species" may be either singular or plural, as the context dictates.

The "valence number" is a positive whole number that represents the ability of an atom or a group of atoms to combine with other atoms or groups of atoms. The valence number is determined by the number of electrons that an atom can lose, add, or share. As examples, Mg has a typical valence number of 2 (forming $Mg^{2+}$ by giving up two electrons) and Cl has a typical valence number of 1 (adding one electron to the Cl atom to form $Cl^-$). Note that valence number is distinguished from valency, which can be positive or negative. $Mg^{2+}$ has a valency of +2, while $Cl^-$ has a valency of −1.

Figure 2:
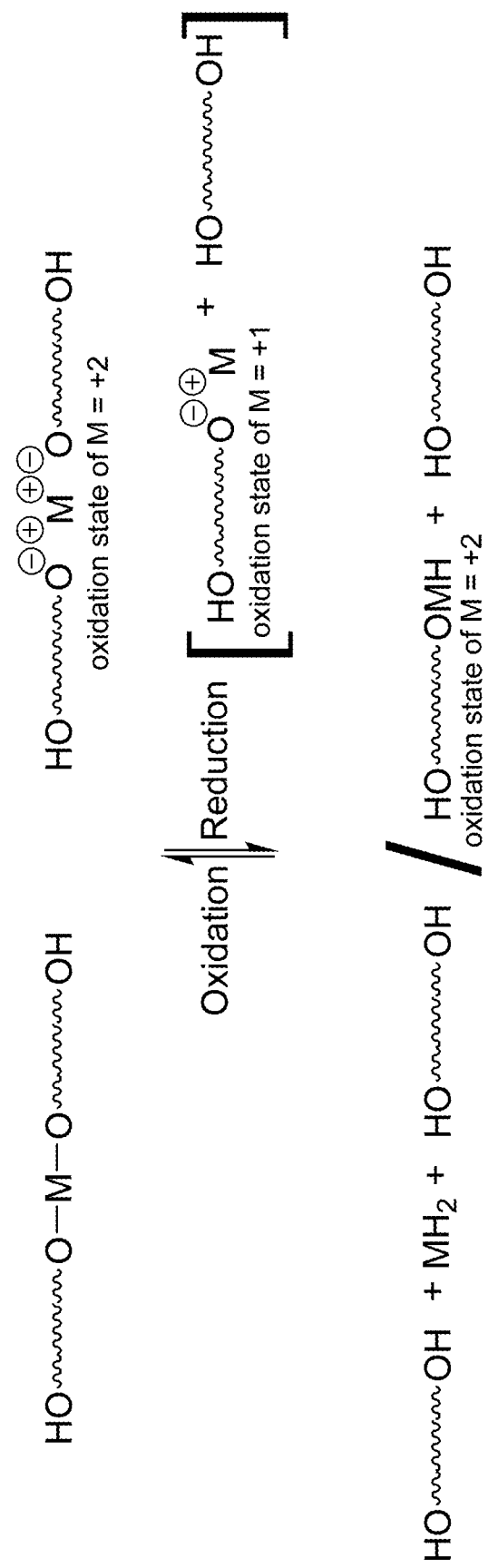
FIG. 2 is a reaction diagram showing reversible ionic bonding within the main chain of an exemplary reworkable polymer, in some embodiments.

Because the valence number of an ionic linkage is preferably at least 2, multiple polymer segments of opposite charge and lower valence number can bind to a single ionic linkage (e.g., see FIG. 2). Ionic linkages within the main chain of the ionomer are capable of undergoing a redox reaction wherein polymer chains can break or form, resulting in a reworkable polymer with differing rheological and mechanical properties. As intended herein, polymer "reworkability" means the ability to change rheological and/or mechanical properties of the polymer. The present disclosure incorporates redox-active components directly within the backbone of the polymer, to provide an environmentally responsive, reworkable component.

Introducing reversible bonding along a polymer backbone can controllably enable significant changes in material properties, including but not limited to a reduction in glass-transition temperature ($T_g$) and/or viscosity, both of which facilitate reworking of the polymer. This technology is not only amenable to linear polymer systems, but also to crosslinkable polymer networks. Also, the present disclosure may be applied to both thermoplastic and thermoset polymers.

Some embodiments provide an environmentally responsive, reworkable polymer. The bond reversibility (and therefore change in material properties) is mediated by chemicals and/or naturally occurring stimuli, such as (but not limited to) sunlight. In some variations, polymer bonds are reversible by utilizing light to reversibly oxidize and reduce metal ions or other ionic species that are present within the main chain of the polymer. It is desirable to harness energy from visible light to induce chemical and physical changes in polymers, in particular by creating and breaking intrachain ionic bonds.

In co-pending U.S. patent application Ser. No. 15/391, 749, it has been shown that by combining ionizable substituents with fluorinated polymers and a hygroscopic polymer, films and coatings are obtained with low friction coefficients. It was also shown that the friction coefficient, as well as the coating's response to humidity, are adjustable by controlling the ionization of the coating. In co-pending U.S. patent application Ser. No. 15/073,610, a fluorinated perfluoropolyether (PFPE) and polyethylene glycol (PEG) are combined in a urethane-based segmented copolymer, along with incorporation of charged species into the polymer chain backbone to increase the water-absorbing power (hygroscopic behavior) of the overall structure beyond that of the PEG species.

Co-pending and commonly owned U.S. patent application Ser. Nos. 15/073,610, 15/391,749, and 15/792,098 are hereby incorporated by reference herein, as applicable to some embodiments of the present invention, which is not limited to the chemistry described in U.S. patent application Ser. Nos. 15/073,610, 15/391,749, and 15/792,098. The monomers described in the cited disclosures can be combined with reducible and oxidizable ionic salt species to effect changes in material mechanical properties, but also can be expanded to the general polymer classes of segmented and non-segmented polyurethanes, polyesters, and/or polyamides.

An object of this invention, in some variations, is to incorporate intrachain ionic linkages when synthesizing the polymer backbone. These intrachain ionic linkages are within the main chain of the polymer, as opposed to solely in pendant side groups. The intrachain ionic linkages are formed between ionic monomers (monomers capable of forming a positive or negative charge) and ionic species of opposite charge polarity compared to the ionic monomers. The polymer can undergo a redox reaction to break or form intrachain ionic linkages, which are therefore reversible. The reversible crosslinking in this invention is primarily due to ionic crosslinking, not covalent crosslinking.

Some variations provide a reworkable ionomer composition comprising:
a polymer containing a plurality of ionic monomers disposed in a chain backbone of the polymer (see e.g. FIG. 1A), wherein the ionic monomers have a monomer charge polarity that is either positive or negative; and
a plurality of ionic species disposed within the chain backbone of the polymer, wherein the ionic species have opposite charge polarity compared to the monomer charge polarity, and wherein the ionic species and the ionic monomers are ionically bonded,
wherein the ionic species are capable of undergoing a reversible oxidation-state transition of at least +1 or −1 when in the presence of a redox reagent.

In some embodiments, the polymer is selected from the group consisting of polyurethanes, polyacrylates, polyamides, polyesters, polyureas, polyurethane-ureas, polysiloxanes, polycarbonates, and combinations thereof.

In some embodiments, the polymer is a segmented polyurethane, such as a segmented polyurethane that comprises:
(a) one or more first soft segments selected from polyethers or polyesters having an average molecular weight from about 500 g/mol to about 20,000 g/mol, wherein the polyethers or polyesters are $(\alpha,\omega)$-hydroxyl-terminated and/or $(\alpha,\omega)$-amine-terminated;
(b) optionally, one or more second soft segments selected from second polyesters or second polyethers, wherein the second polyesters or the second polyethers are $(\alpha,\omega)$-hydroxyl-terminated and/or $(\alpha,\omega)$-amine-terminated;
(c) the ionic species residing within a polymer backbone of (i) the first soft segments, (ii) the second soft segments, or (iii) copolymer chains that are distinct from the first and second soft segments;
(d) one or more isocyanate species, or a reacted form thereof, possessing an isocyanate functionality of 2 or greater; and
(e) one or more polyol or polyamine chain extenders or crosslinkers, or a reacted form thereof.

In certain embodiments, the second soft segments are present, the first soft segments comprise perfluorinated polyether, and the second soft segments comprise poly (ethylene glycol).

In some reworkable ionomer compositions, the ionic monomers have an oxidation state that is +1 or more positive, such as +2 or +3. In other reworkable ionomer compositions, the ionic monomers have an oxidation state that is −1 or more negative, such as −2 or −3. Note that while the oxidation site within a given ionic monomer is typically at one of the ends of the monomer (as depicted in FIG. 2), the oxidation site may be at another position within the monomer, depending on the type of polymerization. When multiple oxidation states are present within the ionic monomers, the average oxidation state may be a non-integer, e.g. the average oxidation state of the ionic monomers may be ±1.5, ±2.5, etc.

The ionic monomers may have a functionality of at least 2, which means that there are at least two functional groups or reactive sites within each ionic monomer molecule. Specific examples of ionic monomers include monomers with functionality greater than or equal to 2 (e.g., two or more hydroxyls, amines, and/or isocyanates), ionically bonded to divalent or trivalent metal cations (e.g., $Ca^{2+}$, $Cu^{2+}$, $Fe^{2+}$, $Fe^{3+}$, $Mg^{2+}$, $Mg^{3+}$, or $Al^{3+}$) as the ionic species. The ionic monomer possesses the ability to undergo a redox reaction which causes the ionic bond (formed with the ionic species) to dissociate. In certain embodiments, the ionic species does not include calcium.

In various embodiments, the ionic monomers and the ionic species are contained in polymer repeat units, or precursors thereof, selected from the group consisting of calcium L-lactate hydrate, iron (II) lactate hydrate, magnesium L-lactate hydrate, aluminum L-lactate, calcium L-ascorbate dihydrate, magnesium salicylate tetrahydrate, calcium salicylate, calcium salt of p-aminobenzoic acid, magnesium salt of p-aminobenzoic acid, aluminum salt of p-aminobenzoic acid, iron salt of p-aminobenzoic acid, and combinations or derivatives thereof.

The ionic monomers may be selected from carboxylates, sulfonates, phosphates, imidazoliums, or combinations, derivatives, or reaction products thereof. In various embodiments, the ionic monomers are selected from the group consisting of 2,2-bis(hydroxymethyl)butyric acid, N,N-bis (2-hydroxyethyl)-2-aminoethanesulfonic acid, N-methyl-2, 2'-iminodiethanol, 3-dimethylamino-1,2-propanediol, 2,2-bis(hydroxymethyl)propionic acid, 1,4-bis(2-hydroxyethyl) piperazine, 2,6-diaminocaproic acid, N,N-bis(2-hydroxyethyl)glycine, 2-hydroxypropanoic acid hemicalsium salt, (2,2-bis-(1-(1-methyl imidazolium)-methylpropane-1,3-diol bromide), 1,2-bis(2'-hydroxyethyl)imidazolium bromide, and (3-hydroxy-2-(hydroxymethyl)-2-methylpropyl)-3-methyl-1H-3$\lambda^4$-imidazol-1-ium bromide, dimethylolpropionic acid, N-methyldiethanolamine, N-ethyldiethanolamine, N-propyldiethanolamine, N-benzyldiethanolamine, N-t-butyldiethanolamine, bis(2-hydroxyethyl) benzylamine, bis(2-hydroxypropyl) aniline, and homologues, combinations, derivatives, or reaction products thereof.

The ionic monomers may be present on or in the polymer backbone at various locations and frequencies, such as at every monomer position (i.e. all monomers charged, as in certain polyelectrolytes), at alternating monomers, periodically, or randomly. Here, "polymer backbone" refers to one or more polymer chains that may be present in the polymer composition.

In some embodiments, the reworkable ionomer composition further comprises a plurality of additional ionic species disposed in pendant groups attached to the chain backbone of the polymer (see e.g. FIG. 2B). The pendant groups themselves may be the additional ionic species (i.e., the pendant group is a single atom that can form an ion), or the pendant groups may contain an ionic site at one of the atoms in a pendant group. The additional ionic species may form ionic linkages with ionic monomers when the ionomer is crosslinked. However, generally, the additional ionic species (in pendant groups) do not necessarily form ionic linkages with the ionic monomer.

In some reworkable ionomer compositions, the ionic species have an oxidation state that is +2 or more positive. In other reworkable ionomer compositions, the ionic species have an oxidation state that is −2 or more negative. When multiple oxidation states are present within the ionic species, the average oxidation state may be a non-integer, e.g. the average oxidation state of the ionic species may be ±1.5, ±2.5, etc.

When the ionomer is reworked by undergoing a redox reaction with a redox reagent, the oxidation state of the ionic species may be decreased in magnitude (e.g., from +2 to +1) and may become neutral (e.g., from +2 to 0). In some embodiments, the ionic species is a multivalent ion. A multivalent ion is an ion (e.g., a metal) that can be in at least two different ionic (non-neutral) states, such as +1 and +2. In some embodiments, the ionic species is a multivalent ion with at least one oxidation state that is +1 or −1, and a different, non-zero oxidation state (e.g., ±2, ±3, and/or ±4).

The ionic species preferably have a redox potential less than 1.0 V, such as a redox potential of about, or less than about, 0.9 V, 0.8 V, 0.7 V, 0.6 V, 0.5 V, 0.4 V, 0.3 V, 0.2 V, or 0.1 V, measured at 25° C.

In some embodiments, the ionic species is a metal ion or salt thereof, containing for example a metal selected from the group consisting of Cu, Ca, Ni, Hg, Cd, Fe, Co, Ti, Sn, Mg, Al, and combinations thereof.

In some embodiments, the ionic species is an organic ion or salt thereof, such as (but not limited to) p-aminobenzoic acid and/or p-aminobenzoate. For example, the organic ion or salt thereof may contain an organic salt selected from the group consisting of calcium salt of p-aminobenzoic acid, magnesium salt of p-aminobenzoic acid, aluminum salt of p-aminobenzoic acid, iron salt of p-aminobenzoic acid, and combinations thereof.

The concentration of ionic species within the reworkable ionomer composition may vary widely. In various embodiments, the concentration of ionic species within the reworkable ionomer composition is from about 0.1 wt % to about 50 wt %, such as about 0.5, 1, 2, 5, 10, 20, 30, or 40 wt %.

The distribution of ionic species within the reworkable ionomer composition may be uniform or non-uniform. That is, the ionic species may be disposed at every charge site of ionic monomers contained in the ionomer, or at less than every charge site, such as about 90%, about 70%, about 50%, about 30%, or about 10% of the charge sites. As noted above, additional ionic species may be present as or in pendant groups attached to the ionomer. In such cases, there may be ionic species disposed at every charge site, or at less than every charge site, within the ionomer. There may be pendant groups with additional ionic species attached to every monomer, or less than every monomer.

The reworkable ionomer composition may further comprise a redox reagent, which may be already present in the composition and/or added at a later time, when a redox reaction is desired. In oxidation-reduction chemistry (also known as redox reactions), a reducing agent reduces another chemical and is itself oxidized. Conversely, an oxidizing agent oxidizes another chemical and is itself reduced.

As intended herein, a "redox reagent" is a chemical that can undergo an oxidation or reduction reaction with a metal ion or other charged species, thereby reducing or oxidizing, respectively, the metal ion or other charged species. A redox reagent is therefore capable of changing the valency (oxidation state) of the metal ion or other charged species. The redox reagent may be a reducing agent, an oxidizing agent, or a chemical that may function as either a reducing agent or an oxidizing agent, depending on external conditions, such as pH, temperature, or electromagnetic radiation.

Some embodiments incorporate species which utilize environmentally abundant resources, such as light or other electromagnetic radiation, to promote a redox reaction. Some embodiments utilize a triggerable redox reagent that is incorporated into the polymer and activated when desired. In these or other embodiments, a triggerable redox reagent is externally added to the composition at a later time, when a reversible property change is desired. For example, in some embodiments, a redox reagent is applied to the reworkable ionomer composition by wiping, for polymer repair on demand. In some embodiments, the reworkable ionomer composition is exposed to acidic or basic conditions to protonate ionic groups (in the ionic monomers) on the polymer backbone, thereby causing ionic species to be removed.

When present, the redox reagent may be present in the composition at a concentration from about 0.01 wt % to about 50 wt %, such as about 0.05 wt %, 0.1 wt %, 0.2 wt %, 0.5 wt %, 1 wt %, 2 wt %, 5 wt %, 10 wt %, 20 wt %, 30 wt %, or 40 wt %. The preferred concentration of redox reagent will depend, at least in part, on the redox potential of the selected ionic species, the concentration of ionic species within the reworkable ionomer composition, and whether reversal of all ionic bonds is desired.

The redox reagent may be selected from the group consisting of organic acids, organic bases, inorganic acids, inorganic bases, and combinations thereof.

In some embodiments, the redox reagent is an organic photosensitizer. In other embodiments, the redox reagent is an inorganic photosensitizer. A mixture of organic and inorganic photosensitizers may be employed.

In some embodiments, the redox reagent is selected from the group consisting of ascorbic acid, catechols, sodium hydroxide, hydrochloric acid, tris(bipyridine)ruthenium(II) ([Ru(bpy)$_3$]$^{2+}$) chloride, methylene blue, titanium dioxide, and combinations thereof, for example.

Within the reworkable ionomer composition, other components besides the ionomer (i.e., the polymer containing ionic monomers) may be present, including other polymers or additives, for example. In various embodiments, the ionomer is present in the overall composition from about 0.1 wt % to about 99.9 wt %, such as about 1, 5, 10, 20, 30, 40, 50, 60, 70, 80, 90, 95, or 99 wt %. In various embodiments, the concentration of ionomer plus ionic species is from about 0.5 wt % to about 100 wt %, such as about 1, 5, 10, 20, 30, 40, 50, 60, 70, 80, 90, 95, or 99 wt %.

The reworkable ionomer composition may be disposed in a coating or film. It is also possible to form structural objects from the reworkable ionomer composition—that is, the use of the composition is not limited to coatings and films.

FIG. 1A is a depiction of ionic species (I) distributed within the main polymer chain, versus solely in ionic pendant groups. FIG. 1B is a depiction of ionic species (I) distributed within the main polymer chain, as well as in ionic pendant groups. The squiggly line in FIGS. 1A and 1n FIG. 1B represents the main polymer chain which is formed from polymerized ionic monomer. The polymer chain forms ionic linkages with the ionic species (I). The valence number of the ionic species is preferably at least 2.

When ionic pendant groups are present (FIG. 1B), the reversible bonding does not necessarily utilize these pendant groups. In some embodiments, the reversible bonding relies solely on ionic species distributed within pendant groups and not on ionic species distributed within the main polymer chain. In some embodiments, the reversible bonding relies solely on ionic species distributed within the main polymer chain and not on ionic species distributed within pendant groups. Finally, in some embodiments, the reversible bonding relies on both ionic species distributed within the main polymer chain as well as ionic species distributed within pendant groups.

Some variations provide a method of reworking or otherwise treating an ionomer composition, the method comprising:

(a) providing a starting polymer containing a reworkable ionomer composition comprising: a polymer containing a plurality of ionic monomers disposed in a chain backbone of the polymer, wherein the ionic monomers have a monomer charge polarity that is either positive or negative; and a plurality of ionic species disposed within the chain backbone of the polymer, wherein the ionic species have opposite charge polarity compared to the monomer charge polarity, wherein the ionic species and the ionic monomers are ionically bonded, and wherein the ionic species are capable of undergoing a reversible oxidation-state transition of at least +1 or −1 when in the presence of a redox reagent;

(b) providing the redox reagent and effective first reaction conditions for the redox reagent to cause the reversible transition of at least +1 or −1 of an oxidation state of the ionic species, wherein polymer fragments containing the ionic monomers are generated, and wherein the ionic species are disposed within the polymer fragments or are contained within other reaction products; and (c) at a different time from step (b), providing effective second reaction conditions for the redox reagent to cause an opposite transition, compared to step (b), of at least −1 or +1 of the oxidation state of the ionic species, thereby generating a reworked polymer with the same, similar, or different mechanical and/or rheological properties, compared to the starting polymer.

Effective first and second reaction conditions for steps (b) and (c), respectively, may be selected from redox reagent concentration, pH, temperature, exposure to electromagnetic radiation, and reaction time, for example. The redox reagent concentration for steps (b) and/or (c) may be selected from about 0.01 wt % to about 50 wt %, for example. The pH for steps (b) and/or (c) may be selected from about 0 to about 5 or from about 9 to about 14, for example. The temperature for steps (b) and/or (c) may be selected from about 20° C. to about 150° C., for example. The electromagnetic radiation (if any) for steps (b) and/or (c) may be selected from ultraviolet, visible, or infrared wavelengths, for example. The reaction time for steps (b) and/or (c) may be selected from about 1 minute to about 24 hours, for example.

Reference is made to FIG. 2 which depicts the reversible reaction for an exemplary reworkable ionomer composition. FIG. 2 is a reaction diagram showing reversible ionic bonding within the main chain, providing reworkability to polymers that are otherwise unable generally to undergo such mechanical and/or rheological changes. In FIG. 2, the starting polymer (top of reaction diagram) contains ionic species, depicted as metal M, that form ionic linkages with ionic monomers that have charge sites at terminal oxygen (O) atoms. The oxidation states of the ionic monomers and ionic species are explicitly shown on the top right-hand side, showing an oxidation state of ionic monomer of −1 and an oxidation state of ionic species of +2. Upon reduction in the presence of a redox reagent and/or electromagnetic energy (e.g., light), the equilibrium reaction proceeds to form products as shown on the bottom of the reaction diagram. The ionic species M may form a molecule MH$_2$ along with polymers that do not contain M. Alternatively, or additionally, the ionic species may form polymer fragments terminating in OMH groups. In either case, the oxidation state of M is +2. The oxidation state of M within reaction products may be the same as, or different than, the oxidation state of M in the reactants. However, the reaction proceeds through a reaction intermediate (depicted in FIG. 2 in square brackets), in which the oxidation state of ionic species M is +1 in the polymer fragments generated. Therefore, in the reaction shown in FIG. 2, in either direction—oxidation or reduction—there is a reversible transition of +1 or −1, respectively, of an oxidation state of the ionic species M. Various degrees of ionic and covalent bonding may be present in the reaction product(s).

The reaction products of FIG. 2 (bottom of diagram) collectively form the reworkable ionomer composition in the process of being reworked. After step (c) is performed, the composition is a reworked polymer, which may have different mechanical and/or rheological properties, compared to the starting polymer subjected to the reworking method. In some embodiments, mechanical and/or rheological properties are restored to original properties of the ionomer composition prior to use or damage. For example, a starting polymer may be removed and then reapplied, perhaps in a different location, resulting in a reworked polymer with the same or similar properties as the starting polymer.

In some variations of the invention, an ionomer decomposition product comprises:

(a) polymer fragments containing at least one ionic monomer, wherein said ionic monomer has a monomer charge polarity that is either positive or negative;
(b) a plurality of ionic species disposed within said polymer fragments or contained within oxidized or reduced reaction products, wherein said ionic species have opposite charge polarity compared to said monomer charge polarity; and
(c) a redox reagent capable of causing a reversible transition of at least +1 or −1 of an oxidation state of said ionic species.

Some variations provide a reworkable ionomer system comprising:
(a) a first polymer state comprising a polymer containing a plurality of ionic monomers disposed in a chain backbone of the polymer, wherein the ionic monomers have a monomer charge polarity that is either positive or negative; and a plurality of ionic species disposed within the chain backbone of the polymer, wherein the ionic species have opposite charge polarity compared to the monomer charge polarity, wherein the ionic species and the ionic monomers are ionically bonded, and wherein the ionic species are capable of undergoing a reversible oxidation-state transition of at least +1 or −1 when in the presence of a redox reagent;
(b) a second polymer state following exposure of the first polymer state to a redox reagent to cause the reversible transition of at least +1 or −1 of an oxidation state of the ionic species, wherein the second polymer state contains polymer fragments containing the ionic monomers, and wherein the ionic species are disposed within the polymer fragments or are contained within other reaction products; and
(c) a third polymer state following exposure of the second polymer state to a redox reagent to cause an opposite transition, compared to (b), of at least −1 or +1 of the oxidation state of the ionic species, wherein the third polymer state is a reworked polymer.

The redox reagent may include an organic photosensitizer or an inorganic semiconducting photosensitizer, for example. A "photosensitizer" is a molecule that produces a chemical change in another molecule, such as oxidation or reduction, in a photochemical process induced by light. Photosensitizers (when present) may include at least one organic photosensitizer, such as (but not limited to) photosensitive organic dyes, e.g. tris(bipyridine)ruthenium(II) ([Ru(bpy)$_3$]$^{2+}$) chloride, methylene blue (methylthioninium chloride), or triphenylamine-based organic dyes. Alternatively, or additionally, photosensitizers may include at least one inorganic photosensitizer, such as (but not limited to) photosensitive inorganic dyes (e.g., transition-Metal-Complex cationic dyes), metal oxides, or semiconductors. An exemplary inorganic photosensitizer is titanium dioxide.

A photosensitizer may be provided in addition to one or more oxidizable or reducible species, such as (but not limited to) ethanol, dimethylamine, or dimethylaniline. That is, the polymer composition may include an organic photosensitizer or an inorganic semiconducting photosensitizer, for example, in addition to a species that can be oxidized or reduced via the photosensitizer when in the presence of light.

In some embodiments, the redox reagent requires light for activation, while in other embodiments, the redox reagent does not require light for activation. Certain redox reagents will work without light but will be more effective (e.g., faster reduction or oxidation of ions) with at least some light present.

Photosensitive dyes have the ability to absorb visible light, promoting an electron from ground state to an excited state. Reversible crosslinking agents may be selected with desirable redox potentials with respect to photosensitive dyes or other photosensitizers.

Some embodiments utilize aspects of the disclosure in Oster et al., "Photoreduction of metal ions by visible light," *J. Am. Chem. Soc.*, 1959, 81 (21), pages 5543-5545, which is hereby incorporated by reference herein for its teaching of the reduction of various metal ions with a photoreducing dye in the presence of a sacrificial anion under visible light, and for its teaching of various photosensitive dyes. This technique may be used to reduce metal ions embedded within polymer films and coatings disclosed herein.

In some embodiments, the redox reagent is selected from the group consisting of ascorbic acid, hydrazine, sodium borohydride, benzenediols, and combinations thereof.

The redox reagent may be present in the polymer composition itself, or may be provided at a later time. For example, gaseous oxidizing agents such as oxygen or ozone, or gaseous reducing agents such as hydrogen, carbon monoxide, or syngas, may be introduced to the polymer composition. It is also possible to incorporate a triggerable redox reagent in the polymer composition, wherein the triggerable redox reagent is responsive to an external activating signal that could be magnetic or electromagnetic, for example.

The redox reagent, or a reacted form thereof, may be present from about 0.01 wt % to about 20 wt %, such as about 0.05, 0.1, 0.2, 0.5, 1, 1.5, 2, 3, 4, 5, 10, or 15 wt % of the polymer composition. From 0 to 100% of the redox agent may be present in initial form (e.g., as an oxidizing agent or a reducing agent). From 0 to 100% of the redox agent may be present in reacted form (e.g., reduced, when initially present an oxidizing agent, or oxidized, when initially present a reducing agent).

The ionic species may function as a reversible crosslinking agent, in some embodiments. The reversible crosslinking agent may include a metal ion, such as (but not limited to) a metal ion selected from the group consisting of ions of Cu, Ca, Ni, Hg, Cd, Fe, Co, Ti, Sn, and combinations thereof. Metal ions, generally speaking, are both reducible and oxidizable, which imparts crosslinking reversibility to the polymer. Metal ions may generally be selected from alkali metals, alkaline earth metals, transition metals (including Cd, Zn, and Hg), or post-transition metals.

In some embodiments, the reversible crosslinking agent may include an organic ion, such as but not limited to adipate. Adipate is an ion of adipic acid or is an adipate salt. Adipate may be present in monoanionic form ($HO_2C(CH_2)_4CO_2^-$) and/or in dianionic form ($^-O_2C(CH_2)_4CO_2^-$). The adipate may be introduced to the polymer composition as a salt, such as sodium adipate or potassium adipate. Other organic ions or organic salts may be employed. Preferably, the organic ion or salt is both reducible and oxidizable, to impart crosslinking reversibility to the polymer.

In some embodiments, the reversible crosslinking agent may include an inorganic ion, such as but not limited to tetrathionate. The tetrathionate anion, $S_4O_6^{2-}$, is a sulfur oxoanion derived from the compound tetrathionic acid, $H_2O_4O_6$. Two of the sulfur atoms present in the ion are in oxidation state 0 and two are in oxidation state +5. Other polythionates may be used as the reversible crosslinking agent. Other inorganic ions or inorganic salts may be employed. Preferably, the inorganic ion or salt is both reducible and oxidizable, to impart crosslinking reversibility to the polymer.

In some embodiments, the reversible crosslinking agent is "difunctional," which means that it contains a net divalent (or higher) charge that is separated atomically within the molecule. Adipate and tetrathionate, discussed above, are both examples of difunctional, reversible crosslinking agents. The charges in a difunctional molecule may be present at atoms disposed on opposite ends of the molecule (as in the case of adipate), or one charge may be at the end of the molecule while another is at an atomic center, for example. Note that a metal ion $M^{2+}$ is classified as divalent but is not difunctional, because the charge is not separated on different atoms.

Preferably, the reversible crosslinking agent is readily reducible and/or oxidizable, with a low redox potential, which is a measure of the tendency of a chemical species to acquire electrons and thereby be reduced, or to give up electrons and thereby be oxidized. "Reduction potential" is the tendency of a chemical species to acquire electrons and be reduced. The reduction potential is measured in volts; the more positive the reduction potential, the greater is the species' affinity for electrons and tendency to be reduced (oxidation state becomes less positive or more negative). By sign convention, a negative reduction potential means a high tendency to give up electrons and be oxidized.

In this invention, the charge polarities may all be reversed, with the same effect achieved. Therefore, reference will be made to "redox potential" as an absolute value of reduction potential, as standard electrode potential in volts relative to the standard hydrogen electrode. For example, a redox potential of 0.5 V refers to ±0.5 V, i.e. either a reduction potential of +0.5 V or a reduction potential of –0.5 V (which equates to an oxidation potential of +0.5 V). A redox potential less than 0.5 V refers to a reduction potential less than +0.5 V, or a reduction potential less negative than –0.5 V. That is, the reduction potential $E_h$ in this example is in a range given by either $0<E_h<0.5$ V or $0>E_h>-0.5$ V.

The redox potential of the reversible crosslinking agent is preferably less than 1.0 V, more preferably less than 0.5 V, even more preferably less than 0.3 V. In various embodiments, the redox potential of the reversible crosslinking agent is about, or less than about, 1.0, 0.9, 0.8, 0.7, 0.6, 0.5, 0.4, 0.3, 0.2, 0.1, or 0.05 V. As an example, the tetrathionate ion utilized in some embodiments has a redox potential of about 0.2 V.

The reversible crosslinking agent may be present from about 0.1 wt % to about 50 wt %, such as about 0.2, 0.5, 1, 2, 5, 10, 20, 30, or 40 wt %. The reversible crosslinking agent may be present in various oxidation states. From 0 to 100% of the reversible crosslinking agent may be present in the first oxidation state. From 0 to 100% of the reversible crosslinking agent may be present in the second oxidation state, and/or in another oxidation state different from the first oxidation state.

The crosslinks are reversible by chemical, electrical, electromagnetic, electrochemical, electromechanical, or other non-thermal means. Combinations of techniques may be employed.

Some embodiments employ light, or other electromagnetic radiation, to induce the creation and/or dissociation of a crosslink. As intended herein, "light" means the ultraviolet, visible, and/or infrared regions of electromagnetic radiation, with wavelengths of about 10 nm to about 1000 nm, such as about 100 nm to about 700 nm.

Some preferred embodiments utilize sunlight, which is a clean, abundant energy source. Sunlight (solar light) is therefore a convenient, low-cost source of visible light to induce chemical and physical changes in polymer compositions disclosed herein. As is known, solar light is not monochromatic. The sun emits light primarily in the visible spectrum (about 400-700 nm), but it also emits photons at other wavelengths, starting at about 200 nm and exceeding 2000 nm.

An alternative to sunlight is artificial light, from a laser source, ambient source (other than the sun), or another source. The light may be transmitted through space or through a material such as an optical fiber, for exposure to the polymer. In some embodiments, a light source is spatially divided into one or more individual beams, focused on a selected region of the polymer (e.g., for directed healing of cracks). Certain embodiments utilize laser-guided healing of selected locations in a polymer system.

In some embodiments, the light exposure is temporary, to cause a property change. The light exposure may be periodic, i.e. with some defined interval between light treatments, or non-periodic (e.g., on-demand). Constant light exposure may be utilized, to maintain thermoplastic properties even in the presence of random oxidants which would otherwise tend to reverse the polymer to thermoset properties, for example.

In addition to such electromagnetic treatment, electrical, electrochemical, or electromechanical techniques may be utilized to change the reversible crosslinking agent capable from a first oxidation state to a second oxidation state. Direct electrical current (or alternating current) may be supplied to electrodes disposed with the polymer, such as in layers, to reduce the reversible crosslinking agent (or to extract electrons, to oxidize the reversible crosslinking agent). Photovoltaically active regions may be included in the polymer, configured to convert incoming light into electricity that reduces the reversible crosslinking agent.

Other techniques to induce crosslink reversibility include, but are not limited to, controlling reaction conditions or environmental conditions such as pH, humidity, pressure, temperature, or a combination thereof. Centrifugation, ultrasonication, or other mechanical treatments may be included.

Generally speaking, thermal energy and mechanical forces may optionally be utilized to assist in crosslink reversibility. That is, the polymer compositions disclosed herein generally do not require heating or cooling to break or form crosslink bonds, but temperature control may still be included in these methods, such as to optimize rates of reactions or mass transfer. Light-activated treatment may cause local heating that can be removed by cooling, if needed. Thermal treatments may be applied to the polymers for reasons other than crosslink chemistry, including to produce parts, to melt polymer for recycling, and so on.

In some embodiments, the polymer composition further contains one or more additional components selected from the group consisting of a particulate filler, a substrate adhesion promoter, a pigment, a coloring agent, a plasticizer, a flattening agent, and a flame retardant.

The polymer composition may be disposed in a coating or film, or in any other object. Other objects include, but are not limited to, containers, pipes, engineered parts, circuit boards, and consumer products. In certain embodiments, an object containing a polymer composition disclosed herein may be reversibly crosslinked (or uncrosslinked) to repair the object or adjust its properties, for example.

The chemical and/or mechanical transition associated with reversible crosslinking can give an anti-corrosion effect, an anti-fouling effect, a "self-healing" effect (also known as "re-mendability"), and/or switchability between mechanical properties associated with thermoplastic and thermoset plastics, for example.

The reversible crosslink density can give rise to many reversible differences in properties, including chemical properties (e.g., solvent or acid resistance), physical properties (e.g. density or porosity), mechanical properties (e.g., strength or toughness), electrical properties (e.g., electrical resistivity), and so on.

In some embodiments, the polymer composition is characterized as "thermoplastic/thermoset-switchable" which means that the composition can be transformed between thermoset properties and thermoplastic properties. A lower crosslink density, for example, gives mechanical properties associated with thermoplastic polymers. This can be done for a certain period of time, such as to allow the polymer to self-heal (e.g., repair cracks or other defects)—followed by reversal back to thermoset properties arising from the higher crosslink density.

In preferred embodiments, the reversible crosslinking of the polymer network does not utilize high temperature (heating) as a trigger. In various embodiments, reversible crosslinking occurs in response to an acid, a base, a redox reagent, and/or light-mediated chemical reaction. In preferred embodiments, the polymer network is contained in a film or coating, not in a sol-gel system.

In some embodiments, ionic species are introduced into the main polymer chain of segmented polyurethane or polyurea systems. These systems demonstrate strong hydrogen bonding potential and as a result can create strong associative forces between the chains. In order to produce elastomeric materials, regions of highly flexible and weakly interacting chains (soft segments) are incorporated with strongly associating elements (hard segments) in a segmented copolymerization scheme. Segmented copolymers provide a synthetic route toward block architectures using segments with vastly differing properties. Such synthesis typically results in chains that possess alternating hard and soft segments composed of regions of high urethane bond density and the chosen soft segment component (e.g., polyol or hygroscopic element), respectively. This covalent linkage of dissimilar hard and soft blocks drives the systems to microphase separation and creates regions of flexible soft blocks surrounding regions of hard blocks. The associative forces among the hard segments prevent flow under stress and can produce elastomeric materials capable of displaying high elongation and tensile strength.

Within a segmented copolymer framework, there is the ability to incorporate ionic bonds along the main polymer chain at various locations, depending on the order of addition. The primary requirement is a monomer with two or more reactive groups such as alcohol, amine, or isocyanate moieties and a compound with a valence number greater than or equal to 2 within the backbone of the molecule. Specific examples include calcium L-lactate hydrate, iron (II) lactate hydrate, magnesium L-lactate hydrate, aluminum L-lactate, calcium L-ascorbate dihydrate, magnesium salicylate tetrahydrate, calcium salicylate, calcium salt of p-aminobenzoic acid, magnesium salt of p-aminobenzoic acid, aluminum salt of p-aminobenzoic acid, iron salt of p-aminobenzoic acid, or a combination or derivative thereof.

In a more specific embodiment of the disclosure, there is provided a segmented polyurethane copolymer composition. The composition comprises one or more ($\alpha,\omega$)-amine terminated or ($\alpha,\omega$)-hydroxyl-terminated polyether first soft segments having an average molecular weight of between about 500 grams per mole to about 10,000 grams per mole. The composition further comprises one or more polyethylene glycol (PEG) second soft segments having an average molecular weight of between about 500 grams per mole to about 10,000 grams per mole. Additionally, the composition comprises one or more low-molecular-weight ionic monomers structured such that the ionic charge is within the polymer backbone and contains two or more alcohol, amine, and/or isocyanate reactive species, such as calcium L-lactate, and potentially comprises an additional diol or diamine functional redox reagent, such as ascorbic acid.

A total content of the one or more first soft segments and the one or more second soft segments is from about 40% by weight to about 90% by weight, based on a total weight percent of the composition. The composition further comprises one or more hard segments present in an amount of from about 15% by weight to about 50% by weight, based on the total weight percent of the composition. The composition further comprises one or more low-molecular-weight ionic monomers structured such that the ionic charge is within the main backbone of the polymer, the ionic monomers being present in an amount of from about 0.5% to 15% by weight, based on the total weight percent of the composition. The one or more hard segments comprise a combination of one or more isocyanate species and one or more low molecular weight polyol or polyamine chain extenders.

In certain embodiments of the invention, the polymer matrix contains a substantially continuous matrix containing a first component; and, dispersed within the matrix, a plurality of inclusions containing a second component that is chemically different than the first component, wherein one of the first component or the second component is a first polymer having a low surface energy between about 5 mJ/m$^2$ to about 50 mJ/m$^2$, and the other of the first component or the second component is a second polymer containing the one or more ionic monomers, and wherein the first polymer and the second polymer are chemically connected ionically or covalently.

The first polymer may be a fluoropolymer selected from the group consisting of polyfluoroethers, perfluoropolyethers, polyfluoroacrylates, polyfluorosiloxanes, and combinations thereof.

In certain embodiments, the first polymer is a fluoropolymer having an average molecular weight from about 500 g/mol to about 20,000 g/mol, wherein the fluoropolymer is ($\alpha,\omega$)-hydroxyl-terminated and/or ($\alpha,\omega$)-amine-terminated, and wherein the fluoropolymer is present in the triblock structure:

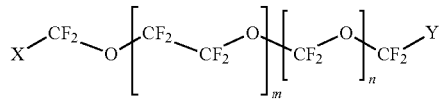

wherein:
X, Y=CH$_2$—(O—CH$_2$—CH$_2$)$_p$-T, and X and Y are independently selected;
p=1 to 50;
T is a hydroxyl or amine terminal group;
m=1 to 100; and
n=1 to 100.

The second polymer (when present) may be selected from the group consisting of polyethers, polyesters, polysiloxanes, polycarbonates, polyelectrolytes, and combinations thereof. In some embodiments, the second polymer includes a material selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, PEG diacryalate, monoacrylate, and combinations thereof.

In certain embodiments, the ionic monomer is selected from the group consisting of (2,2-bis-(1-(1-methyl imidazolium)-methylpropane-1,3-diol bromide), 1,2-bis(2'-hydroxyethyl)imidazolium bromide, (3-hydroxy-2-(hydroxymethyl)-2-methylpropyl)-3-methyl-1H-3$\lambda^4$-imidazol-1-ium bromide, 2,2-bis(hydroxymethyl)butyric acid, N,N-bis(2-hydroxyethyl)-2-aminoethanesulfonic acid, N-methyl-2,2'-iminodiethanol, 3-dimethylamino-1,2-propanediol, 2,2-bis(hydroxymethyl)propionic acid, 1,4-bis(2-hydroxyethyl) piperazine, 2,6-diaminocaproic acid, N,N-bis(2-hydroxyethyl)glycine, 2-hydroxypropanoic acid hemicalsium salt, dimethylolpropionic acid, N-methyldiethanolamine, N-ethyldiethanolamine, N-propyldiethanolamine, N-benzyldiethanolamine, N-t-butyldiethanolamine, bis(2-hydroxyethyl) benzylamine, bis(2-hydroxypropyl) aniline, and homologues, combinations, derivatives, or reaction products thereof.

In some embodiments, the first polymer and the second polymer are covalently connected in a block copolymer. The first polymer and second polymer may be phase-separated, i.e. they do not form a single continuous phase. There is preferably chemical and/or physical bonding between the first polymer and the second polymer.

Within the segmented copolymer, the isocyanate species may be selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof.

The polyol or polyamine chain extenders or crosslinkers may have an average functionality of at least 3. In some embodiments, the polyol or polyamine chain extenders or crosslinkers are selected from the group consisting of 1,3-butanediol, 1,4-butanediol, 1,3-propanediol, 1,2-ethanediol, diethylene glycol, triethylene glycol, tetraethylene glycol, propylene glycol, dipropylene glycol, tripropylene glycol, neopentyl glycol, 1,6-hexane diol, 1,4-cyclohexanedimethanol, ethanol amine, diethanol amine, methyldiethanolamine, phenyldiethanolamine, glycerol, trimethylolpropane, 1,2,6-hexanetriol, triethanolamine, pentaerythritol, ethylenediamine,1,3-propanediamine, 1,4-buatendiamine, diethyltoluenediamine, dimethylthiotoluenediamine, isophoronediamine, diaminocyclohexane, N,N,N',N'-tetrakis (2-hydroxypropyl) ethylenediamine, and homologues, combinations, derivatives, or reaction products thereof.

It is noted that ($\alpha,\omega$)-terminated polymers are terminated at each end of the polymer. The $\alpha$-termination may be the same or different than the $\omega$-termination. Also, it is noted that in this disclosure, "($\alpha,\omega$)-termination" includes branching at the ends, so that the number of terminations may be greater than 2 per polymer molecule. The polymers herein may be linear or branched, and there may be various terminations and functional groups within the polymer chain, besides the end ($\alpha,\omega$) terminations.

In some embodiments, the molar ratio of the second soft segments (when present) to the first soft segments is from about 0.1 to about 2.0. In various embodiments, the molar ratio of the second soft segments to the first soft segments is about 0, 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 1.95.

In this description, "polyurethane" is a polymer comprising a chain of organic units joined by carbamate (urethane) links, where "urethane" refers to N(H)—(C=O)—O—. Polyurethanes are generally produced by reacting an isocyanate containing two or more isocyanate groups per molecule with one or more polyols containing on average two or more hydroxyl groups per molecule, in the presence of a catalyst.

Polyols are polymers in their own right and have on average two or more hydroxyl groups per molecule. For example, ($\alpha,\omega$)-hydroxyl-terminated perfluoropolyether is a type of polyol.

"Isocyanate" is the functional group with the formula —N=C=O. For the purposes of this disclosure, —C(=O)—N(H)—R is considered a derivative of isocyanate. "Isocyanate functionality" refers to the number of isocyanate reactive sites on a molecule. For example, diisocyanates have two isocyanate reactive sites and therefore an isocyanate functionality of 2. Triisocyanates have three isocyanate reactive sites and therefore an isocyanate functionality of 3.

"Polyfluoroether" refers to a class of polymers that contain an ether group—an oxygen atom connected to two alkyl or aryl groups, where at least one hydrogen atom is replaced by a fluorine atom in an alkyl or aryl group.

"Perfluoropolyether" (PFPE) is a highly fluorinated subset of polyfluoroethers, wherein all hydrogen atoms are replaced by fluorine atoms in the alkyl or aryl groups.

"Polyurea" is a polymer comprising a chain of organic units joined by urea links, where "urea" refers to N(H)—(C=O)—N(H)—. Polyureas are generally produced by reacting an isocyanate containing two or more isocyanate groups per molecule with one or more multifunctional amines (e.g., diamines) containing on average two or more amine groups per molecule, in the presence of a catalyst.

A "chain extender or crosslinker" is a compound (or mixture of compounds) that link long molecules together and thereby complete a polymer reaction. Chain extenders or crosslinkers are also known as curing agents, curatives, or hardeners. In polyurethane/urea systems, a curative is typically comprised of hydroxyl-terminated or amine-terminated compounds which react with isocyanate groups present in the mixture. Diols as curatives form urethane linkages, while diamines as curatives form urea linkages. The choice of chain extender or crosslinker may be determined by end groups present on a given prepolymer. In the case of isocyanate end groups, curing can be accomplished through chain extension using multifunctional amines or alcohols, for example. Chain extenders or crosslinkers can have an average functionality greater than 2, such as 3 or greater, i.e. beyond diols or diamines.

The one or more chain extenders or crosslinkers (or reaction products thereof) may be present in a concentration, in the segmented copolymer composition, from about 0.01 wt % to about 20 wt %, such as about 0.05 wt % to about 10 wt %.

Note that in certain embodiments, a prepolymer is generated or provided with excess alcohol functionality and curing is done with an isocyanate chain extender.

In some embodiments, the fluoropolymers are selected from the group consisting of perfluoropolyethers, polyfluoroacrylates, polyfluorosiloxanes, and combinations thereof.

In certain embodiments, the chain ends include different PEG chain lengths. That is, the fluoropolymers may include a fluoropolymer segmented copolymer with poly(ethylene glycol) having the formula HO—(CH$_2$—CH$_2$—O)$_p$—CH$_2$—CF$_2$—O—(CF$_2$—CF$_2$—O)$_m$(CF$_2$—O)$_n$—CF$_2$—CH$_2$—(O—CH$_2$—CH$_2$)$_q$—OH wherein p=0 to 50; q=0 to 50 and q is independently selected from p; m=1 to 100; and n=1 to 100. In certain of these embodiments, one of either p or q is selected from 6 to 50 while the other is selected from 0 to 50. In some embodiments, one or both of the X groups is amine-terminated rather than hydroxyl-terminated.

In some embodiments, the polyesters or polyethers are selected from the group consisting of poly(oxymethylene), poly(ethylene glycol), poly(propylene glycol), poly(tetrahydrofuran), poly(glycolic acid), poly(caprolactone), poly(ethylene adipate), poly(hydroxybutyrate), poly(hydroxyalkanoate), and combinations thereof.

In some embodiments, the isocyanate species is selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis (phenyl isocyanate), isophorone diisocyanate, and combinations or derivatives thereof.

The polyol or polyamine chain extender or crosslinker possesses a functionality of 2 or greater, in some embodiments. At least one polyol or polyamine chain extender may be selected from the group consisting of 1,4-butanediol, 1,3-propanediol, 1,2-ethanediol, glycerol, trimethylolpropane, ethylenediamine, isophoronediamine, diaminocyclohexane, and homologues, derivatives, or combinations thereof.

Following a suitable chemical reaction, the segmented copolymer composition contains, in a hard segment, the reacted form of the one or more isocyanate species, combined with the reacted form of the one or more polyol or polyamine chain extenders or crosslinkers. In some embodiments, the hard segment is present in an amount from about 5 wt % to about 60 wt %, based on total weight of the composition.

In some embodiments, the segmented copolymer composition is derived from an uncured precursor containing the fluoropolymers, the ionic species, the isocyanate species, and the polyol or polyamine chain extenders or crosslinkers, wherein the uncured precursor is dissolved in a non-aqueous, organic solvent. This is known as a solventborne system.

Any known methods to fabricate these materials or coatings may be employed. Notably, these materials or coatings may utilize synthesis methods that enable simultaneous deposition of components or precursor materials to reduce fabrication cost and time. In particular, these materials or coatings may be formed by a one-step process, in some embodiments. In other embodiments, these materials or coatings may be formed by a multiple-step process. Coatings may be cast or sprayed from organic solution or from aqueous solution.

The polymer, in some embodiments, is formed from a precursor material (or combination of materials) that may be provided, obtained, or fabricated from starting components. The precursor material is capable of hardening or curing in some fashion, to form a polymer. The precursor material may be a liquid; a multiphase liquid; a multiphase slurry, emulsion, or suspension; a gel; or a dissolved solid (in solvent), for example.

In some variations of the invention, a material or coating precursor is applied to a substrate (such as a surface of an automobile or aircraft) and allowed to react, cure, or harden to form a final coating, wherein the material, coating precursor, or final coating contains a reversible crosslinking agent and optionally a redox reagent.

In some embodiments, a precursor material is prepared and then dispensed (deposited) over an area of interest. Any known methods to deposit precursor materials may be employed. A fluid precursor material allows for convenient dispensing using spray coating or casting techniques over a large area, such as the scale of a vehicle or aircraft.

The fluid precursor material may be applied to a surface using any coating technique, such as (but not limited to) spray coating, dip coating, doctor-blade coating, spin coating, air knife coating, curtain coating, single and multilayer slide coating, gap coating, knife-over-roll coating, metering rod (Meyer bar) coating, reverse roll coating, rotary screen coating, extrusion coating, casting, or printing. Because relatively simple coating processes may be employed, rather than lithography or vacuum-based techniques, the fluid precursor material may be rapidly sprayed or cast in thin layers over large areas (such as multiple square meters).

When a solvent or carrier fluid is present in the fluid precursor material, the solvent or carrier fluid may include one or more compounds selected from the group consisting of water, alcohols (such as methanol, ethanol, isopropanol, or tert-butanol), ketones (such as acetone, methyl ethyl ketone, or methyl isobutyl ketone), hydrocarbons (e.g., toluene), acetates (such as n-butyl acetate or tert-butyl acetate), acids (such as organic acids), bases, and any mixtures thereof. When a solvent or carrier fluid is present, it may be in a concentration of from about 10 wt % to about 99 wt % or higher, for example.

The precursor material may be converted to an intermediate material or the final polymer using any one or more of curing or other chemical reactions, or separations such as removal of solvent or carrier fluid, monomer, water, or vapor. Curing refers to toughening or hardening of a polymeric material by crosslinking of polymer chains, assisted by electromagnetic waves, electron beams, heat, and/or chemical additives. Chemical removal may be accomplished by heating/flashing, vacuum extraction, solvent extraction, centrifugation, etc. Physical transformations may also be involved to transfer precursor material into a mold, for example. Additives may be introduced during the hardening process, if desired, to adjust pH, stability, density, viscosity, color, or other properties, for functional, ornamental, safety, or other reasons.

The overall thickness, or other dimension, of the final polymer material may be from about 1 µm to about 1 cm or more, such as about 10 µm, 20 µm, 25 µm, 30 µm, 40 µm, 50 µm, 75 µm, 100 µm, 500 µm, 1 mm, 1 cm, or 10 cm.

EXAMPLES

Materials. Poly(ethylene glycol) (PEG) with molecular weight ($M_n$) of 3,400 g/mol, 4,4'-methylenebis(cyclohexyl isocyanate) (HMDI), 1,4-butanediol (BD), dibutyltin dilaurate (DBTDL), 2,2-bis(hydroxymethyl)propionic acid, N-methyldiethanolamine, potassium tetrathionate, titanium dioxide, L-ascorbic acid, copper (II) acetate, and calcium L-lactate are purchased from Sigma Aldrich. Fluorolink materials (Fluorolink D4000, Fluorolink E10H, and Fluorolink 5147X) are purchased from Solvay Specialty Polymers. All chemicals are used as received without further purification.

Example 1: Synthesis of Polymer with Ionic Monomers

Hydroxyl-terminated poly(ethylene glycol) ($M_n$=3400 g/mol, 2.50 g, 0.74 mmol) is placed in a 3-neck round-bottom flask that contains an inlet for argon and is equipped with an overhead stirrer (Teflon shaft and blade). While stirring, 4,4'-methylenebis(cyclohexyl isocyanate) (3.72 g, 14.20 mmol) is added to the solution and the flask is placed in an oil bath at 100° C. Dibutyltin dilaurate (0.02 wt %) catalyst is then added to the solution using a micropipette and the reaction is allowed to proceed.

After 1 h, 2,2-bis(hydroxymethyl)propionic acid (0.39 g, 2.91 mmol) is added to the stirring solution and allowed to dissolve and react for 1 h. After 1 h, Fluorolink E10-H (2.78 g, 1.40 mmol) is added to the stirring solution and allowed to react for 2 h at 100° C., forming a prepolymer.

The prepolymer is then allowed to cool down to room temperature. The prepolymer is diluted with tetrahydrofuran (9.15 mL) and placed in a plastic mixing container (FlackTek speedmixer compatible). In a separate vial, 1,4-butanediol (0.77 g, 8.54 mmol) is weighed and diluted with tetrahydrofuran (0.5 mL). The two solutions are combined in the mixing container and placed in the FlackTek at 2300 rpm for 15 s. The polymer can be cast from solution or sprayed using an airbrush to create a polyurethane film/coating.

Example 2: Synthesis of Polymer with Ionic Monomers

Hydroxyl-terminated poly(ethylene glycol) ($M_n$=3400 g/mol, 2.50 g, 0.74 mmol) is placed in a round-bottom flask that contains an inlet for argon and is equipped with an overhead stirrer (Teflon shaft and blade). While stirring, 4,4'-methylene-bis(cyclohexyl isocyanate) (4.49 g, 17.14 mmol) is added to the solution and the flask is placed in an oil bath at 100° C. Dibutyltin dilaurate (0.02 wt %) catalyst is then added to the solution using a micropipette and the reaction is allowed to proceed.

After 1 h, 2,2-bis(hydroxymethyl)propionic acid (0.79 g, 5.89 mmol) is added to the stirring solution and allowed to dissolve and react for 1 h. After 1 h, Fluorolink E10-H (2.78 g, 1.40 mmol) is added to the stirring solution and allowed to react for 2 h at 100° C., forming a prepolymer.

The prepolymer is then allowed to cool down to room temperature. The prepolymer is diluted with tetrahydrofuran (12.75 mL) and placed in a plastic mixing container (FlackTek speedmixer compatible). In a separate vial, 1,4-butanediol (0.77 g, 8.54 mmol) is weighed and diluted with tetrahydrofuran (0.5 mL). The two solutions are combined in the mixing container and placed in the FlackTek at 2300 rpm for 15 s. The polymer can be casted from solution or sprayed using an airbrush to create a polyurethane film/coating.

Example 3: Synthesis of Polymer with Ionic Monomers

In a typical experiment, hydroxyl-terminated poly(ethylene glycol) (2.50 g, 0.74 mmol) is placed in a 3-neck round-bottom flask that contains an inlet for argon and is equipped with an overhead stirrer (Teflon shaft and blade). While stirring, 4,4'-methylenebis(cyclohexyl isocyanate) (1.85 g, 7.06 mmol) is added to the solution and the flask is placed in an oil bath at 100° C. Dibutyltin dilaurate (0.02 wt %) catalyst is then added to the solution using a micropipette and the reaction is allowed to proceed.

After 1 h, 2,2-bis(hydroxymethyl)propionic acid (0.30 g, 2.24 mmol) is added to the stirring solution and allowed to dissolve and react for 1 h. After 1 h, Fluorolink E10-H (1.46 g, 0.97 mmol) is added to the stirring solution and allowed to react for 2 h at 100° C., forming a prepolymer.

The prepolymer (6.1 g) is then allowed to cool down to room temperature. The prepolymer is diluted with tetrahydrofuran (6.5 mL) and placed in a plastic mixing container (FlackTek speedmixer compatible). In a separate vial, 1,4-butanediol (0.30 g, 3.33 mmol) is weighed and diluted with tetrahydrofuran (0.5 mL). The two solutions are combined in the mixing container and placed in the FlackTek at 2300 rpm for 15 s. The polymer can be casted from solution or sprayed using an airbrush to create a polyurethane film/coating.

Example 4: Synthesis of Polymer with Ionic Monomers and Internal Redox Reagent

In a typical experiment, hydroxyl-terminated poly(ethylene glycol) (8.50 g, 1 mol eq) is placed in a 3-neck round-bottom flask that contains an inlet for argon and is equipped with an overhead stirrer (Teflon shaft and blade). While stirring, 4,4'-methylenebis(cyclohexyl isocyanate) (6.29 g, 9.6 mol eq) is added to the solution and the flask is placed in an oil bath at 100° C. Dibutyltin dilaurate (0.02 wt %) catalyst is then added to the solution using a micropipette and the reaction is allowed to proceed.

After 1 h, 2,2-bis(hydroxymethyl)propionic acid (1.01 g, 3 mol eq) and L-ascorbic acid (0.44 g, 1 mol eq) is added to the stirring solution and allowed to dissolve and react for 2 h. After 2 h, Fluorolink E10-H (4.95 g, 1 mol eq) is added to the stirring solution and allowed to react for 2 h at 100° C., forming a prepolymer.

The prepolymer is then allowed to cool down to room temperature. The prepolymer is diluted with tetrahydrofuran (~21 mL) and placed in a plastic mixing container (FlackTek speedmixer compatible). In a separate vial, 1,4-butanediol (0.811 g, 3.6 mol eq) is weighed and diluted with tetrahydrofuran (0.9 mL). The two solutions are combined in the mixing container and placed in the FlackTek at 2300 rpm for 15 s. The polymer can be casted from solution or sprayed using an airbrush to create a polyurethane film/coating.

Example 5: Synthesis of Calcium Lactate—Containing Polyurethane (PEG)

In a typical experiment, hydroxyl-terminated poly(ethylene glycol) (5.00 g, 1.5 mmol) is placed in a 3-neck roundbottom flask that contains an inlet for argon and is equipped with an overhead stirrer (Teflon shaft and blade). While stirring, 4,4'-methylenebis(cyclohexyl isocyanate) (4.65 g, 17.7 mmol) is added to the solution and the flask is placed in an oil bath at 100° C. Dibutyltin dilaurate (0.02 wt %) is then added to the solution using a micropipette and the reaction is allowed to proceed.

After 1 h, freeze-dried calcium L-lactate (1.60 g, 7.34 mmol) is added to the stirring solution and allowed to dissolve and react for 1 h. After 1 h, Fluorolink E10-H (2.91 g, 1.47 mmol) is added to the stirring solution and allowed to react for 2 h at 100° C., forming a prepolymer.

The prepolymer is then allowed to cool down to room temperature. The prepolymer is diluted with solvent and placed in a plastic mixing container (FlackTek speedmixer compatible). In a separate vial, 1,4-butanediol (0.66 g, 7.32 mmol) is weighed. The 1,4-butanediol is added to the prepolymer in the mixing container and placed in the FlackTek at 2300 rpm for 15 s. The polymer can be casted from solution or sprayed using an airbrush to create a polyurethane film/coating.

Example 6: Synthesis of Calcium Lactate—Containing Polyurethane (PTMO)

In a typical experiment, hydroxyl-terminated poly(tetramethylene ether glycol) (5.00 g, 1.7 mmol) is placed in a 3-neck roundbottom flask that contains an inlet for argon and is equipped with an overhead stirrer (Teflon shaft and blade).

While stirring, 4,4'-methylenebis(cyclohexyl isocyanate) (1.81 g, 6.9 mmol) is added to the solution and the flask is placed in an oil bath at 100° C. Dibutyltin dilaurate (0.02 wt %) is then added to the solution using a micropipette and the reaction is allowed to proceed.

After 1 h, freeze-dried calcium L-lactate (0.38 g, 1.7 mmol) is added to the stirring solution and allowed to dissolve and react for 16 h, forming a prepolymer.

The prepolymer is then allowed to cool down to room temperature. The prepolymer is diluted with solvent and placed in a plastic mixing container (FlackTek speedmixer compatible). In a separate vial, 1,4-butanediol (0.31 g, 3.4 mmol) is weighed. The 1,4-butanediol is added to the prepolymer in the mixing container and placed in the FlackTek at 2300 rpm for 15 s. The polymer can be casted from solution or sprayed using an airbrush to create a polyurethane film/coating.

Example 7: Reworkable Polymer Using $Ca^{2+}$ Ions

To test the mechanical response of the polymer films with metal ions in the backbone, films are soaked in aqueous 100 mM calcium hydroxide solutions (calcium ions are known to bind very tightly to carboxylic acid groups). To test the removal of $Ca^{2+}$ from the polymer films, the samples are then soaked in hydrochloric acid solutions to protonate the carboxylic acid groups for removal of $Ca^{2+}$ ions. Mechanical properties are evaluated using dynamic mechanical analysis.

Figure 6:
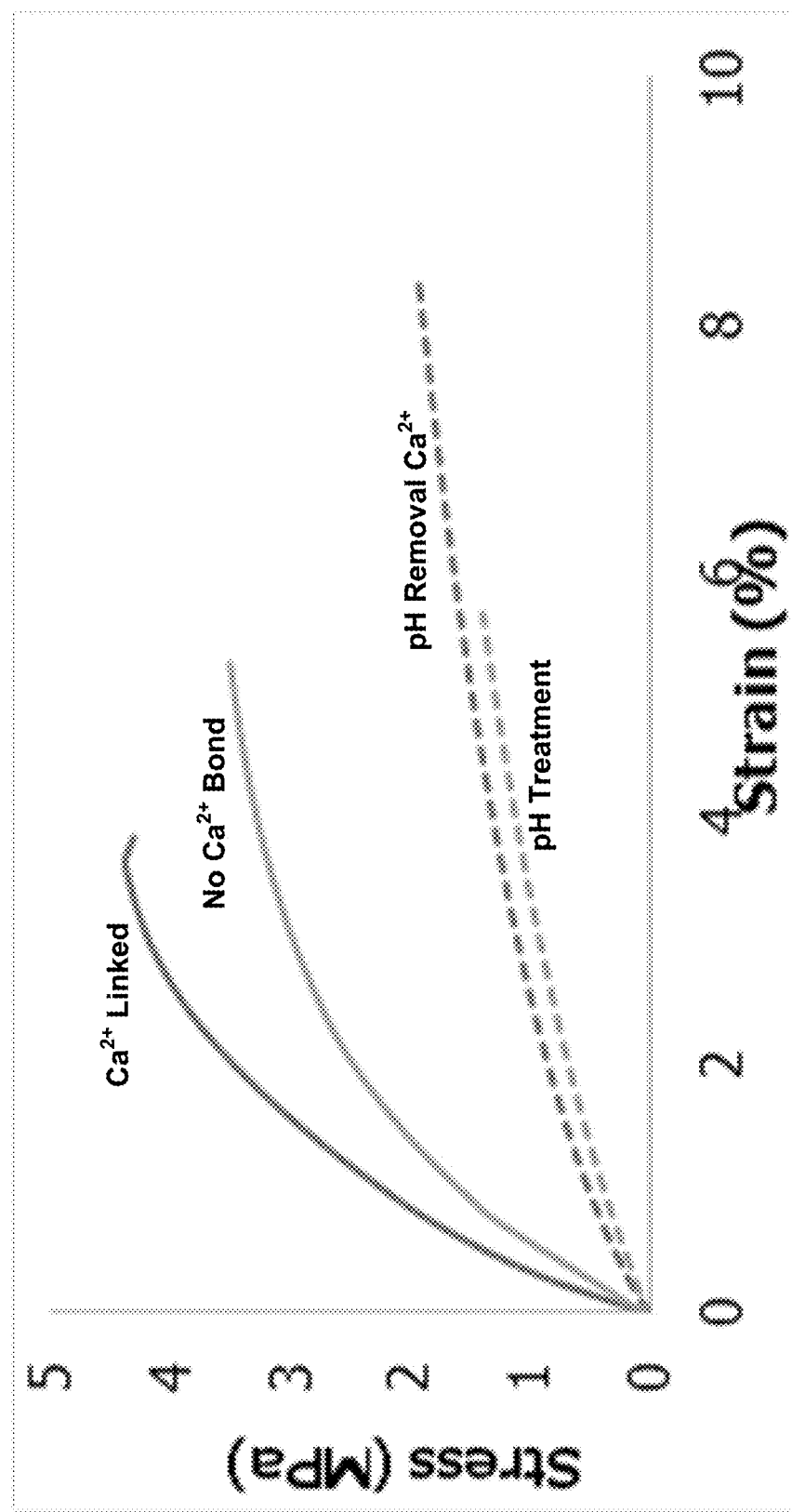
FIG. 6 shows tensile test results of a $Ca^{2+}$-containing polymer film and a control film (without $Ca^{2+}$ in the backbone), before and after pH treatment, in Example 7.

A polymer containing calcium ions along the backbone is synthesized using calcium L-lactate, according to Examples 5 and 6. The polymer film is soaked in HCl to reduce the Ca ions and remove those ions from the polymer backbone, reducing the molecular weight of the polymer chains in the film. Tensile tests of both the original and reduced Ca-containing polymer film and a control film are shown in FIG. 6. The differing mechanical response of the neat polymer (solid, darker-colored line) and reduced polymer (dotted, darker-colored line) is indicative of the successful reduction of Ca ions.

To evaluate whether disruption of hydrogen bonding might be a cause of the difference in properties, a control polymer without $Ca^{2+}$ linkages in the backbone, is generated. A polymer with a similar composition to the reworkable polymer without the $Ca^{2+}$ linkages is synthesized and subjected to the same HCl soak as the film containing Ca in the backbone. The control polymer contains polyurethane linkages and forms a durable film by hydrogen bonding. Tensile tests of the original and reduced polymer film are shown in FIG. 6 (lighter-colored lines), overlaid with the results of the reworkable polymer (darker-colored lines). The differing mechanical response of the neat and treated polymer may be due to the aggressive 100 mM HCl solution. Therefore, hydrogen bond disruption may explain at least some of the difference in mechanical performance.

In this example, polymers containing metal species with valence charges >+1 are synthesized using commercially available monomers, and mechanically tested before and after an HCl soak that reduces and removes the metal ions.

Example 8: Reversible Crosslinking Using pH

Charged constituents in polymers are both water-absorbing and bound with counterions, and when incorporated into polymer systems, they have the ability to change the bulk and surface properties in response to materials bound to the network. These highly charged constituents are incorporated into the polymer coating to demonstrate reversible inter-chain crosslinking. Upon addition into the polymer, the functional groups are protonated and uncharged, allowing the network to be held together by the hydrogen bonding in hard segment domains of concentrated urethane bonds.

In order to test the crosslinking ability of these polymer films with metal ions, films of the Example 1 or 2 polymer are soaked in calcium hydroxide ($Ca(OH)_2$) solutions (calcium ions bind tightly to carboxylic acid groups). To test for reversible crosslinking within the polymer film, the samples are then soaked in hydrochloric acid solutions to protonate the carboxylic acid groups for removal of $Ca^{2+}$ ions.

Material properties are analyzed using dynamic mechanical analysis (DMA) instrument (Q800, TA Instruments). Modulus versus temperature is screened (1 Hz, 3° C./min) along with stress-versus-strain response of the coating films (5%/min). Large specimens are cut into dog bones and tested for tensile strength and elongation using an Instron 5565, 10 mm/min.

Figure 3:
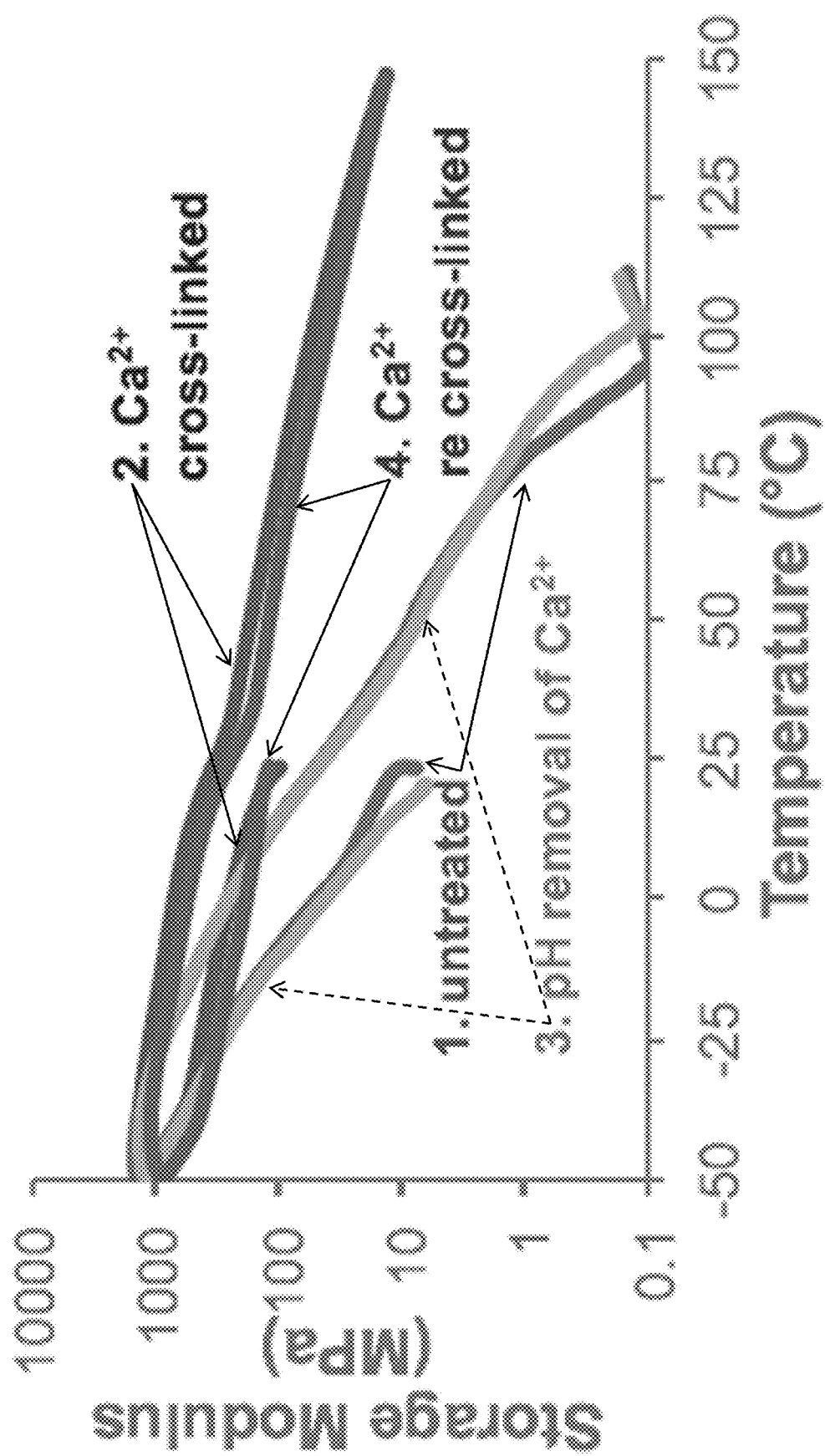
FIG. 3 shows a graph of polymer storage modulus versus temperature, with $Ca^{2+}$ as the reversible crosslinking agent, demonstrating a full cycle of reversibility in Example 8.

DMA screens of modulus versus temperature provide information on rigidity of the samples as well as transition temperatures ($T_g$ and $T_m$). FIG. 3 shows a full cycle of reversible crosslinking demonstrated using $Ca^{2+}$ as a model metal ion, with sequential $Ca^{2+}$ and HCl soaks. At room temperature, the film modulus starts at 13 MPa for the untreated film and reaches 132 MPa for the $Ca^{2+}$-soaked film, giving a 10-fold increase in modulus. Another notable difference from this data is the melting/softening temperature of the untreated and $Ca^{2+}$-soaked films. The hydrogen bonding of urethane groups destabilizes with heat, and the untreated film melts long before reaching 150° C. On the other hand, the $Ca^{2+}$-soaked film maintains a modulus of 14 MPa at 150° C., indicative of ion-mediated crosslinking giving higher thermal stability.

The same film is then soaked in acidic solution (HCl) to protonate the functional groups in order to destabilize crosslinking and remove $Ca^{2+}$, which results in complete reversal to a lower modulus and melting temperature. In order to prove reversibility, the film is re-soaked in $Ca^{2+}$ solution, regaining rigidity and thermal stability, and overlapping with the previous $Ca^{2+}$-soaked modulus versus temperature curve in FIG. 3.

Example 9: Reversible Crosslinking Using Reducible Ions

In this example, polymer films are prepared (Example 1 or 2 polymer) and crosslinked using copper (II) metal ions with proven reducibility with photosensitive dyes. Embedded metal ions are tested for chemical and light reduction within film and properties analyzed by DMA analysis. Following a similar protocol to $Ca^{2+}$ crosslinking (Example 8), the films are soaked in a $Cu^{2+}$ solution.

Figure 4:
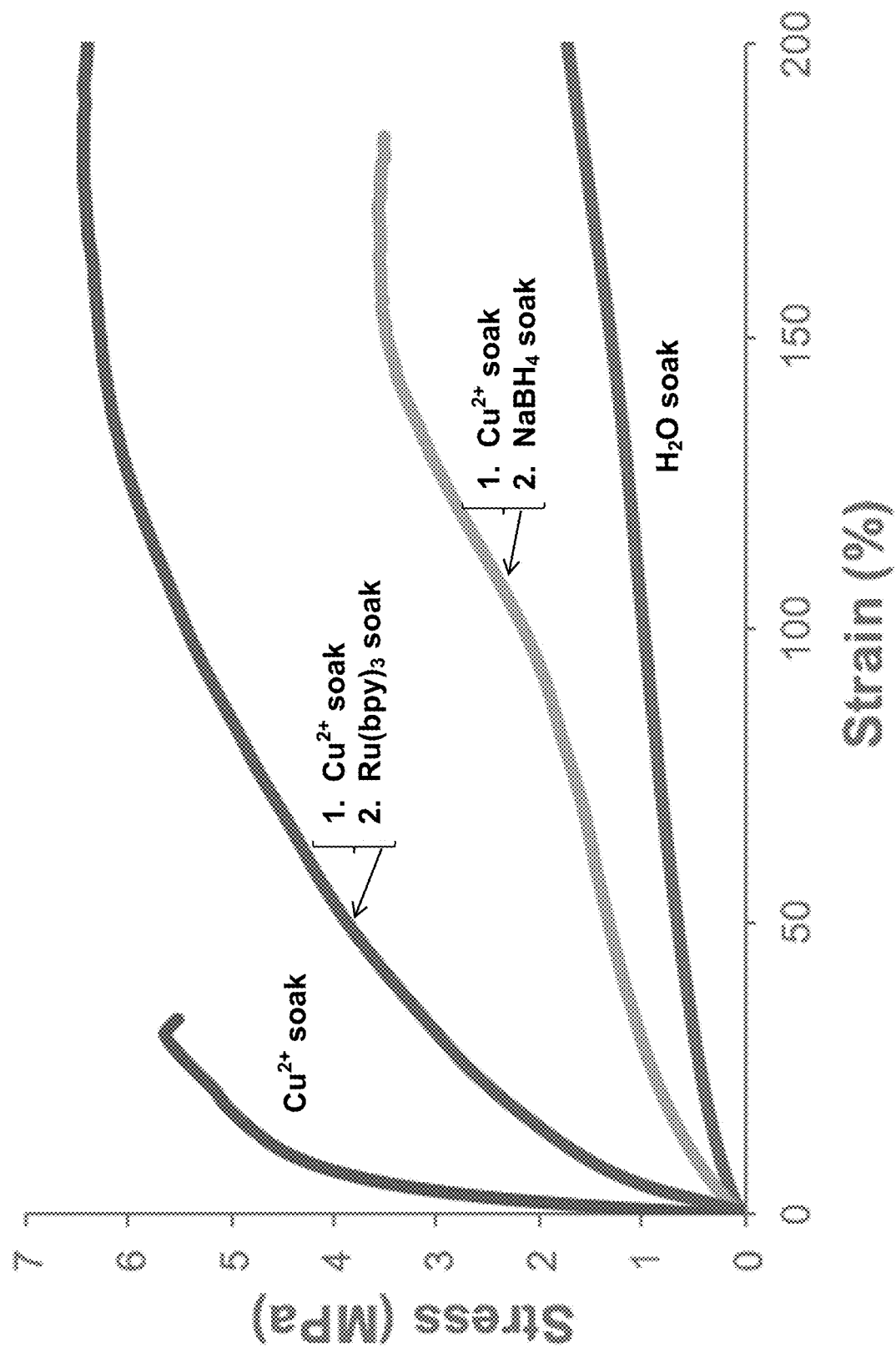
FIG. 4 shows a graph of polymer stress versus strain, with $Cu^{2+}$ as the reversible crosslinking agent, demonstrating a change in mechanical response (tensile stress and strain) of the polymer in Example 9.

It is experimentally found that $Cu^{2+}$ induces a higher crosslinking density, reducing the flexibility of the film versus the highly flexible untreated film. After $Cu^{2+}$ exposure, the film requires 10× the amount of stress to strain the film by 30% elongation, compared to the film without exposure to copper (II) ions (FIG. 4).

When the metal ions are chemically reduced, the film's initial properties are almost recovered with only 2× the amount of stress needed for 30% elongation, as compared to the film before $Cu^{2+}$ exposure.

To test light-induced reduction, $Cu^{2+}$ embedded films are soaked in a solution containing photosensitizing dye and electron donors. After irradiating with light, the film is tested and shows almost a 50% reduction in the amount of stress needed to elongate 30%. The tests also show that the ions in the film are reduced with visible light when soaked with photosensitizing dye.

Example 10: Reversible Crosslinking with Organic Redox Reagent

Figure 5:
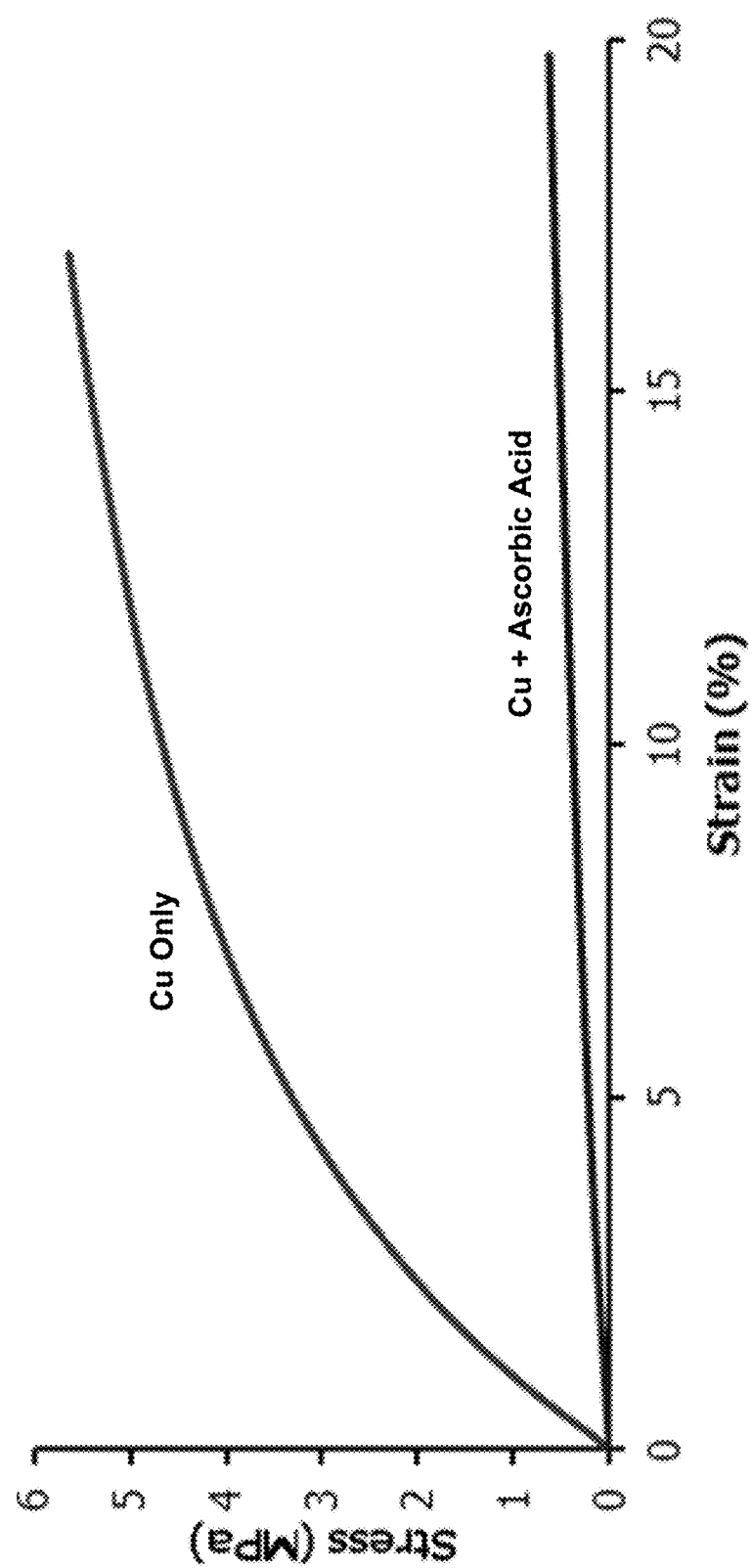
FIG. 5 shows a graph of polymer stress versus strain, with $Cu^{2+}$ as the reversible crosslinking agent and ascorbic acid as a redox reagent, demonstrating a change in mechanical response (tensile stress and strain) of the polymer in Example 10.

The polymer of Example 3 is used, with ascorbic acid as the redox reagent. A post-cure method is utilized to incorporate copper(II) crosslinking moieties into the polymer film. FIG. 5 shows the polymer film before (top curve) and after (bottom curve) soaking in an ascorbic acid solution. This chart demonstrates the redox reaction of $Cu^{2+}$ embedded in the polymer film, using ascorbic acid as the redox reagent.

The film with copper(II) is much tougher (larger area under the stress vs. strain curve) than the exact same film that has soaked in a solution of ascorbic acid. This is indicative of the divalent copper(II) cations ionically crosslinking with the ionic species (2,2-bis(hydroxymethyl)propionic acid) contained in the polymer. After reduction of the copper species to a non-crosslinking state, the polymer strength diminishes substantially. The reversible crosslinking gives a reversible transition in mechanical properties.

Example 11: Chemical Reduction and Photoreduction of Metal Ions

Polymer films are soaked in solutions of calcium hydroxide, copper (II) acetate, or iron (II) acetate to incorporate the metal cations into the polymer network. The ions are reduced chemically, with a reducing agent such as sodium borohydride or hydrazine, or with UV-light. In the latter system, the metal crosslinked polymer film is subsequently soaked in an aqueous solution of tris(bipyridine)ruthenium (II) chloride ($[Ru(bpy)_3]^{2+}$) and dimethylamine. A broadband mercury lamp is used to irradiate the polymer film and induce a photoactivated reduction. Mechanical properties are tested by dynamic mechanical analysis. The reduction of metal ions in solution is followed using ultraviolet-visible spectroscopy (Perkin Elmer Lambda 950). This is accomplished by monitoring the change in absorbance spectrum as valence state of the metal ions changes.

Example 12: Solution-Based Reduction of Copper-Containing Polymer of Example 3

A piece of cured polymer from Example 3 is soaked in a 10 mM aqueous copper acetate solution for about 24 h. The film is then removed from the solution and allowed to dry at room temperature. The mechanical properties are measured and the film is then soaked in either a 10 mM solution of sodium borohydrate or 10 mM ascorbic acid solution (80:20 water:acetonitrile). After about 24 h in solution, the film is removed and patted dry, and the tensile properties are evaluated. The film is then dried at 50° C. for 30 min and again subjected to mechanical testing.

Example 13: Photoreduction of Copper-Containing Polymer of Example 3

In one approach to achieving photoreduction of metallic ions, an organometallic photosensitizer is employed. A piece of cured Example 3 polymer is soaked in a 10 mM aqueous copper (II) acetate solution for about 24 h. The film is then removed from solution and allowed to dry at room temperature, and the mechanical properties are measured. The sample is then soaked in 10 mM tris(bipyridine)ruthenium (II) ($[Ru(bpy)_3]^{2+}$) chloride and dimethylaniline for 2 hours. The sample is dried in air at room temperature, and illuminated with a Hg lamp for 12 minutes. The sample is again subjected to mechanical testing.

Example 14: Photoreduction of Copper-Containing Polymer of Example 3

In another approach to achieving photoreduction of metallic ions, percolating semiconductor nanoparticles are included in the polymer network as a photoinitiator. In particular, a piece of cured Example 3 polymer is sprayed with 1 wt % $TiO_2$. The cured polymer is soaked in a 10 mM aqueous copper (II) acetate solution for about 24 h. The film is then removed from solution and allowed to dry at room temperature, and the mechanical properties are measured.

Variations of the invention provide film, coating, or object containing any of the disclosed polymer compositions. The film, coating, or object may be characterized as reversible, re-mendable, self-healing, mechanically adjustable, and/or thermoplastic/thermoset-switchable, in various embodiments. Additionally, an anti-corrosion benefit can be derived from reversible control of redox species.

Practical applications for the present invention include, but are not limited to, vehicle windows, cameras, optical lenses, filters, instruments, sensors, eyeglasses, aircraft surfaces, satellites, and weapon systems. For example, automotive applications can utilize these coatings to prevent the formation of ice or debris on back-up camera lenses or back-up sensors. The principles taught herein may also be applied to self-cleaning materials, corrosion-free coatings, etc.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:
1. A reworkable ionomer composition comprising:
   a polymer containing a plurality of ionic monomers disposed in a chain backbone of said polymer, wherein said ionic monomers have a monomer charge polarity that is either positive or negative;

a plurality of ionic species disposed within said chain backbone of said polymer, wherein said ionic species is a metal ion or salt thereof, wherein said ionic species have opposite charge polarity compared to said monomer charge polarity, and wherein said ionic species and said ionic monomers are ionically crosslinked; and a redox reagent, wherein said polymer is a block copolymer containing first soft segments covalently connected to second soft segments, wherein said first soft segments and said second soft segments are phase-separated, wherein said ionic species have a reversible oxidation-state transition of at least +1 or 1 in the presence of said redox reagent, and wherein said reversible oxidation-state transition confers reversible ionic crosslinking to said reworkable ionomer composition.

2. The reworkable ionomer composition of claim 1, wherein said polymer is selected from the group consisting of polyurethanes, polyacrylates, polyamides, polyesters, polyureas, polyurethane-ureas, polysiloxanes, polycarbonates, and combinations thereof.

3. The reworkable ionomer composition of claim 2, wherein said polymer is a segmented polyurethane.

4. The reworkable ionomer composition of claim 3, wherein said segmented polyurethane comprises:
(a) one or more said first soft segments selected from polyethers or polyesters having an average molecular weight from about 500 g/mol to about 20,000 g/mol, wherein said polyethers or polyesters are $(\alpha,\omega)$-hydroxyl-terminated and/or $(\alpha,\omega)$-amine-terminated;
(b) one or more said second soft segments selected from second polyesters or second polyethers, wherein said second polyesters or said second polyethers are $(\alpha,\omega)$-hydroxyl-terminated and/or $(\alpha,\omega)$-amine-terminated;
(c) said ionic species residing within a polymer backbone of (i) said first soft segments, (ii) said second soft segments, or (iii) copolymer chains that are distinct from said first and second soft segments;
(d) one or more isocyanate species, or a reacted form thereof, possessing an isocyanate functionality of 2 or greater; and
(e) one or more polyol or polyamine chain extenders or crosslinkers, or a reacted form thereof.

5. The reworkable ionomer composition of claim 4, wherein said first soft segments comprise perfluorinated polyether, and wherein said second soft segments comprise poly(ethylene glycol).

6. The reworkable ionomer composition of claim 1, wherein said ionic monomers have an oxidation state that is +1 or more positive.

7. The reworkable ionomer composition of claim 1, wherein said ionic monomers have an oxidation state that is −1 or more negative.

8. The reworkable ionomer composition of claim 1, wherein said ionic monomers are selected from carboxylates, sulfonates, phosphates, imidazoliums, or combinations, derivatives, or reaction products thereof.

9. The reworkable ionomer composition of claim 1, wherein said ionic monomers are selected from the group consisting of (2,2-bis-(1-(1-methyl imidazolium)-methylpropane-1,3-diol bromide), 1,2-bis(2'-hydroxyethyl)imidazolium bromide, (3-hydroxy-2-(hydroxymethyl)-2-methylpropyl)-3-methyl-1H-3$\lambda^4$-imidazol-1-ium bromide, 2,2-bis(hydroxymethyl)butyric acid, N,N-bis(2-hydroxyethyl)-2-aminoethanesulfonic acid, N-methyl-2,2'-iminodiethanol, 3-dimethylamino-1,2-propanediol, 2,2-bis(hydroxymethyl) propionic acid, 1,4-bis(2-hydroxyethyl)piperazine, 2,6-diaminocaproic acid, N,N-bis(2-hydroxyethyl)glycine, 2-hydroxypropanoic acid hemicalsium salt, dimethylolpropionic acid, N-methyldiethanolamine, N-ethyldiethanolamine, N-propyldiethanolamine, N-benzyldiethanolamine, N-t-butyldiethanolamine, bis(2-hydroxyethyl) benzylamine, bis(2-hydroxypropyl) aniline, and homologues, combinations, derivatives, or reaction products thereof.

10. The reworkable ionomer composition of claim 1, wherein said ionic monomers and said ionic species are contained in polymer repeat units, or precursors thereof, selected from the group consisting of calcium L-lactate hydrate, iron (II) lactate hydrate, magnesium L-lactate hydrate, aluminum L-lactate, calcium L-ascorbate dihydrate, magnesium salicylate tetrahydrate, calcium salicylate, calcium salt of p-aminobenzoic acid, magnesium salt of p-aminobenzoic acid, aluminum salt of p-aminobenzoic acid, iron salt of p-aminobenzoic acid, and combinations or derivatives thereof.

11. The reworkable ionomer composition of claim 1, said composition further comprising a plurality of additional ionic species disposed in pendant groups attached to said chain backbone of said polymer.

12. The reworkable ionomer composition of claim 1, wherein said ionic species have an oxidation state that is +2 or more positive.

13. The reworkable ionomer composition of claim 1, wherein said ionic species have an oxidation state that is −2 or more negative.

14. The reworkable ionomer composition of claim 1, wherein said ionic species is a multivalent ion with at least one oxidation state that is ±1.

15. The reworkable ionomer composition of claim 1, wherein said metal ion or salt thereof contains a metal selected from the group consisting of Cu, Ca, Ni, Hg, Cd, Fe, Co, Ti, Sn, Mg, Al, and combinations thereof.

16. The reworkable ionomer composition of claim 1, wherein said ionic species have a redox potential less than 1.0 V.

17. The reworkable ionomer composition of claim 1, wherein said redox reagent is selected from the group consisting of organic acids, organic bases, inorganic acids, inorganic bases, and combinations thereof.

18. The reworkable ionomer composition of claim 17, wherein said redox reagent is selected from the group consisting of ascorbic acid, catechols, sodium hydroxide, hydrochloric acid, and combinations thereof.

19. The reworkable ionomer composition of claim 1, wherein said redox reagent is an organic photosensitizer.

20. The reworkable ionomer composition of claim 1, wherein said redox reagent is an inorganic photosensitizer.

21. The reworkable ionomer composition of claim 1, wherein said redox reagent is selected from the group consisting of tris(bipyridine)ruthenium(II) ($[Ru(bpy)_3]^{2+}$) chloride, methylene blue, titanium dioxide, and combinations thereof.

22. The reworkable ionomer composition of claim 1, wherein said redox reagent is present in said composition at a concentration from about 0.01 wt % to about 50 wt %.

23. The reworkable ionomer composition of claim 1, wherein said composition is disposed in a coating or film.

24. A method of reworking an ionomer composition, said method comprising:
(a) providing a starting polymer containing a reworkable ionomer composition according to claim 1;

(b) providing said redox reagent and effective first reaction conditions for said redox reagent to cause said reversible transition of at least +1 or −1 of an oxidation state of said ionic species, wherein polymer fragments containing said ionic monomers are generated, and wherein said ionic species are disposed within said polymer fragments or are contained within other reaction products;

(c) at a different time from step (b), providing effective second reaction conditions for said redox reagent to cause an opposite transition, compared to step (b), of at least −1 or +1 of said oxidation state of said ionic species, thereby generating a reworked polymer.

\* \* \* \* \*